United States Patent [19]

Rajchman

[11] Patent Number: 4,523,235

[45] Date of Patent: Jun. 11, 1985

[54] ELECTRONIC MICROCOPIER APPARATUS

[76] Inventor: Jan Rajchman, 268 Edgerstoune Rd., Princeton, N.J. 08540

[21] Appl. No.: 338,505

[22] Filed: Jan. 11, 1982

[51] Int. Cl.³ .............................................. H04N 1/02
[52] U.S. Cl. ............................... 358/256; 346/76 PH; 358/286; 358/293; 358/294
[58] Field of Search ................ 364/705; 358/256, 286, 358/285, 293, 294; 357/19; 346/76 PH, 135.1, 143, 165; 250/528

[56] References Cited

U.S. PATENT DOCUMENTS

| | | |
|---|---|---|
| 2,127,331 | 8/1938 | Fulton .................................. 346/165 |
| 3,318,996 | 5/1967 | Garfield .............................. 358/294 |
| 3,376,551 | 4/1968 | Armbruster ......................... 364/900 |
| 3,417,234 | 12/1968 | Sundblad . |
| 3,466,451 | 9/1969 | Hanchett, Jr. ...................... 358/293 |
| 3,496,333 | 2/1970 | Richardson et al. . |
| 3,501,615 | 3/1970 | Merryman . |
| 3,515,850 | 6/1970 | Cady, Jr. . |
| 3,541,248 | 11/1970 | Young .................................. 358/294 |
| 3,601,669 | 8/1971 | Merryman et al. . |
| 3,609,294 | 9/1971 | Cady et al. . |
| 3,632,969 | 1/1972 | Walkow . |
| 3,700,852 | 10/1972 | Ruggiero . |
| 3,739,095 | 6/1973 | Alden .................................. 358/294 |
| 3,767,020 | 10/1973 | Rowe .................................. 346/143 |
| 3,769,562 | 10/1973 | Bean . |
| 3,777,116 | 12/1973 | Bescia . |
| 3,784,794 | 1/1974 | Allais . |
| 3,811,030 | 5/1974 | Veach . |
| 3,813,513 | 5/1974 | Vora et al. . |
| 3,814,897 | 6/1974 | Otani et al. . |
| 3,852,563 | 12/1974 | Bohorquest . |
| 3,862,394 | 1/1975 | Lane . |
| 3,868,514 | 2/1975 | Isrealson . |
| 3,903,393 | 9/1975 | Stepleton et al. . |
| 3,913,091 | 10/1975 | Aizawa et al. . |
| 3,918,028 | 11/1975 | Humphrey et al. . |
| 3,973,111 | 8/1976 | Washizutka et al. . |
| 3,976,973 | 8/1976 | Martin et al. . |
| 3,982,093 | 9/1976 | Henrion . |
| 3,984,844 | 10/1976 | Tanno et al. . |
| 3,985,999 | 10/1976 | Yonevama . |

(List continued on next page.)

FOREIGN PATENT DOCUMENTS

| | | | |
|---|---|---|---|
| 2917253 | 11/1979 | Fed. Rep. of Germany ...... 250/578 |
| 52-15216 | 2/1977 | Japan ................................... 358/293 |
| 56-24684 | 3/1981 | Japan . |
| 56-63635 | 5/1981 | Japan . |
| 56-116360 | 9/1981 | Japan ................................... 358/294 |

OTHER PUBLICATIONS

Payne & Plumee, "Thermal Printer", Journal of Solid-State Circuits, vol. SC-8, No. 1, Jan. 1973.
Puterbaugh & Emmons, "A New Printing Principle", Spring Joint Computer Conference, 1967, pp. 12–124 of Proceedings.
Gordon E. Challeen, "Development of Thermographic Paper and Methods", Paper #4-6 of 3M.

(List continued on next page.)

Primary Examiner—Joseph A. Orsino, Jr.
Attorney, Agent, or Firm—Richard C. Woodbridge

[57] ABSTRACT

An electronic microcopier apparatus includes a reading head, an electronic memory and a writing head, all contained within a small case that may be held in the hand. In the reading mode the instrument is passed over images, such as written text, where photosensors read the optical information and transmit that information to the electronic memory. The electronic memory stores the information until the device is used in the writing mode. In the writing mode, the information from the electronic memory is fed to a writing head and is faithfully reproduced on a piece of paper. A wheel with angular markings rolls as the copier is displaced over the textural material in both reading and writing modes and thereby makes it possible to ascertain the position of the copier. The invention has the advantage of extreme portability. Several alternative embodiments of the invention are disclosed.

35 Claims, 29 Drawing Figures

U.S. PATENT DOCUMENTS

| | | |
|---|---|---|
| 3,988,569 | 10/1976 | Henrion . |
| 4,007,352 | 2/1977 | Ora . |
| 4,020,465 | 4/1977 | Cochran . |
| 4,027,311 | 5/1977 | Ambrosio . |
| 4,030,408 | 6/1977 | Miwa . |
| 4,034,187 | 7/1977 | Tomioka et al. . |
| 4,105,892 | 8/1978 | Tashiro . |
| 4,110,598 | 8/1978 | Small . |
| 4,115,703 | 9/1978 | Dobras . |
| 4,124,860 | 11/1978 | Johnson ................................ 357/19 |
| 4,136,274 | 1/1979 | Shibata et al. . |
| 4,138,605 | 2/1979 | Stapleton et al. . |
| 4,141,017 | 2/1979 | Henrion . |
| 4,143,809 | 3/1979 | Uebbing et al. . |
| 4,275,404 | 6/1981 | Cassiday et al. ....................... 357/19 |
| 4,319,283 | 3/1982 | Ozawa et al. ......................... 358/286 |
| 4,356,347 | 10/1982 | Wiener ................................. 178/30 |

OTHER PUBLICATIONS

Shibata et al., A New Type of Thermal Head with Thin Films, IEEE Trans., vol. PHP 12, No. 3, Sep. 1976.

R. C. Smith, "Review of Photodetectors", Proc. IEEE, Oct. 1980, pp. 1247–1253.

D. P. Schinke et al., "Semi-conductor Devices", vol. 38 of Topics in Applied Physics, edited by H. Kressel.

J. Ya-Min, "Reduction of Leakage Currents . . . etc.", Electron Devices Trans. IEEE, vol. ED-28, #4, Apr. 1981.

Dyer, Printing Energy Control for a Thermal Printer, IBM Tech. Discl. Bulletin, vol. 24, #7B, Dec. 1981, p. 3973.

Brown, Hand Scanner Optical Assembly, IBM Tech. Discl. Bull., vol. 16, No. 4, Sep. 1973, pp. 1183–1184.

IBM Technical Disclosure Bulletin, "Document Reader and Printer", L. L. Wu, vol. 16, No. 11, Apr. 1974.

Yamazaki & Terashima, "A Low Power Thermal Head Realizing High Quality", 1978 Components Conference Proceeding, pp. 264–270.

Shibata et al., "A New Type of Thermal Head with Thin Films", 26th Electronics Circuits Conference, San Francisco, CA, Apr. 1978, pp. 177–185 of Proceedings.

Hart, Optical Servo Technique, IBM Tech. Discl. Bulletin, vol. 16, No. 9, Feb. 1974, p. 302.

ELECTRONIC MICROCOPIER APPARATUS

This application refers to Disclosure Document No. 103316 executed by Jan Rajchman on Oct. 1, 1981 and filed in the U.S. Patent and Trademark Office on Oct. 5, 1981.

BACKGROUND OF THE INVENTION

1. Field of the Invention

The invention comprises a small, portable, hand held apparatus that can read, store and faithfully reproduce optical images.

2. Need for a Hand Held Copier—or Microcopier

There is need for an instrument that can copy and reproduce a few lines of text and that would be small enough to carry in the pocket of the user. The instrument could be like a pen or a pencil, with one end reading the matter to be copied and the other end reproducing the matter that has been read.

The uses for such an instrument would be many. For example, think how often one needs to copy a name or an address including accurate spelling, street and code numbers, telephone numbers with area codes, etc. The common method is to merely re-write what has already been written. Re-writing of textual material creates mistakes, especially when done in a hurry. Another example of need is cooking recipes which are not very long, but which need to be copied accurately. A very important need is for references to articles or books. In a library it is a great chore to copy the name of the author, the title, the publisher, the journal name, volume number, date, etc., particularly if this has to be done many times. Generally, a great deal of time spent in research is used merely in the copying of references from various different sources. Another important need that would be filled by such a small instrument is from employees of post offices or other large organizations where it is necesssary to copy names and addresses or other data presented by the public. Filling out forms is another laborious task. Frequently it is necessary to write the same information over and over again. A handy way to meet this task would be to store the information in a hand held instrument from which the data can be quickly retrieved. It would also be useful if such a device would handle printed, typewritten, handwritten or graphical information (such as Japanese and Chinese Ideograms). It also would be desirable if such an instrument could be held in the hand. It also should be self powered if possible.

A conventional photocopier fulfills some of the needs described above. It is clear that there is a great need for a hand held copier—a microcopier—capable of reproducing parts of or whole documents. The present invention fullfils this need. There are several desirable implementations all including means to read, store and re-product optical images.

3. Description of the Prior Art

The following patents have been reviewed and are believed to be relevant to the invention. In order to improve the clarity of the disclosure the most relevant patents are discussed in juxtaposition with the relevant structure in the portion of this disclosure entitled "Detailed Description of the Invention". Those patents include the following:

U.S. Pat. Nos. 3,417,234, 3,784,794, 3,868,514, 3,918,028, 3,976,973, 3,985,999, 4,115,703, 4,143,809, 3,496,333, 3,501,615, 3,515,850, 3,601,669, 3,609,294, 3,632,969, 3,700,852, 3,769,562, 3,777,116, 3,811,030, 3,813,513, 3,814,897, 3,852,563, 3,862,394, 3,903,393, 3,913,091, 3,973,111, 3,982,093, 3,984,844, 3,988,569, 4,007,352, 4,020,465, 4,027,311, 4,030,408, 4,034,187, 4,105,892, 4,110,598, 4,136,274, 4,138,605, 4,141,017, 4,203,025, 4,206,541, 4,242,565.

In addition to the foregoing patents, the following non-patent references are also believed to be relevant:

IBM Technical Disclosure Bulletin "Document Reader and Printer" L. L. Wu Vol. 16, No. 11, April, 1974;

Yamazaki & Terashima "A Low Power Thermal Head Realizing High Quality" 1978 Components Conference Proceeding pp 264–270;

Shibata et al "A New Type of Thermal Head with Thin Films" 26th Electronics Circuits Conference, San Francisco, CA April 1978 pp 177–185 of Proceedings;

Payne & Plumee "Thermal Printer" J of Solid-State Circuits Vol. SC-8, Number 1, January 1973;

Shibata et al IEEE Trans. Vol. PHP 12, No. 3 Sept. 1976;

R. C. Smith "Review of Photodetectors" Proc IEEE Oct 1980 pp 1247–1253;

D. P. Schinke et al "Semi-conductor Devices" Vol 38 of "Tropics in Applied Physics" Edited by H. Kressel;

J. Ya-Min "Reduction of Leakage Currents . . . etc" Electron Devices Trans IEEE Vol. ED-28 #4 April 1981;

Puterbaugh & Emmons "A New Printing Principle" Spring Joint Computer Conference 1967 pp 12–124 of Proceedings;

Gordon E. Challeen "Development of Thermographic Paper and Methods" Paper #4–6 of 3M;

Heat Sensitive Copy Sheet—U.S. Pat. No. 3,852,093 granted to O'Leary on Dec. 3, 1974; and, United Technologies Electronics Group of Hartford, Conn. had an advertisement in the Nov. 5, 1981 edition of the Wall Street Journal entitled "Tomorrow's Pencil" in which an instrument with some memory capabilities was hypothesized.

SUMMARY OF THE INVENTION

Briefly described the invention comprises an instrument that may be held in the hand and is capable of both reading and writing. According to one embodiment the instrument is roughly the size of an ordinary pen or pencil. The pen includes a reading head, an electronic memory and a writing head. It is generally employed to read a line of print and is adapted to sweep an area about twice the height of the letters of the text to be copied. Signals from the optical sensors in the reading head are stored in the electronic memory, and, when retrieved, actuate heater elements in the writing head.

The line of the text to be copied is scanned manually by moving the electronic pen over it. A line of photosensors within the pen is oriented vertically, so that each sensor sweeps a horizontal line, and many lines are swept simultaneously. The sensors, and hence the sweeping horizontal lines, are spaced sufficiently close to one another as to provide sufficient detail, perhaps so as to have 8 to 10 sweeps across a letter of the text.

In the writing or printing mode the electronic pen is turned over so that the thermal writing heads contact the paper. A thermally sensitive paper is preferably employed. The writing action of the pen is accomplished by manually sweeping it across the paper. Positioning wheels located at both the writing and reading ends are used to insure correct relative positioning of the characters.

The electronic pen apparatus depends on three technologies, namely, (1) hand-held code reading heads; (2) LSI semiconductor memories; and (3) thermal heater heads. Alternative embodiments of the invention employ unique modifications of the foregoing three technologies in order to obtain hand held microcopiers with improved capabilities. For example, it may be possible to integrate the basic invention into a flat instrument having a wide sweep area. The instrument could be combined with a modern pocket calculator so that the device performs dual functions. Also microcopiers can be made that copy on plain rather than thermosensitive paper.

These and other features of the invention will be more fully understood by referring to the following drawings.

DETAILED DESCRIPTION OF THE INVENTION

Figure 1A:
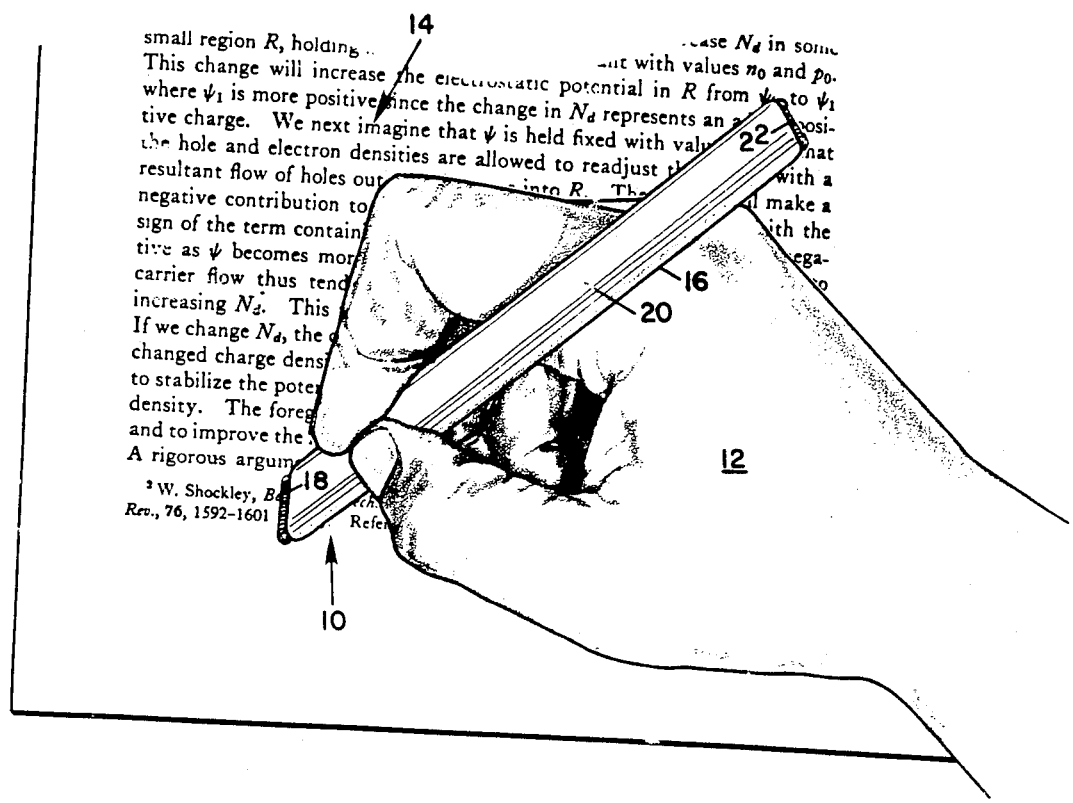
FIG. 1A illustrates the preferred embodiment of the invention in the reading mode.
Figure 1B:
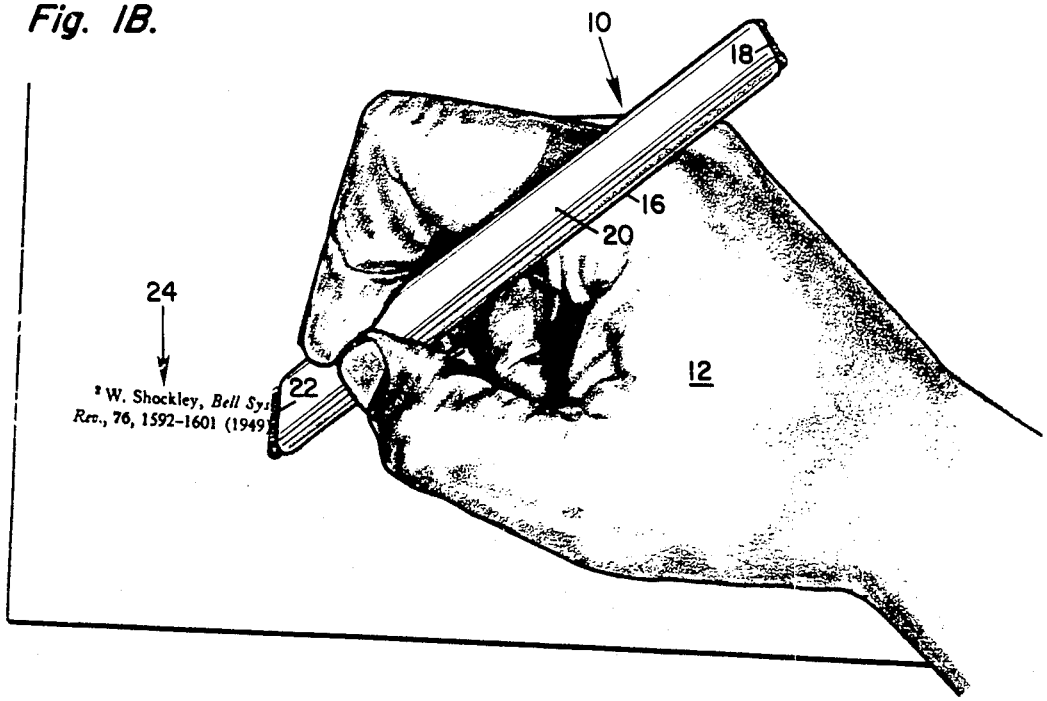
FIG. 1B illustrates the preferred embodiment of the invention in the writing mode.

During the course of this description like numbers will be used to identify like elements according to the different figures which illustrate the invention.

FIRST EMBODIMENT

The preferred embodiment of the invention 10 is illustrated in FIGS. 1A through 6. The invention 10 has an elongated body or housing 16 roughly the size of an ordinary pen or pencil. Reading head 18 includes a number of optically sensitive elements on a line. The pen 10 is preferably held in the user's hand 12 and swept over images 14 in the manner illustrated in FIG. 1A. While the image 14 is illustrated as being print, the device can also reproduce symbols other than writing. The length of the line being read, which in use is oriented vertically, is about twice the height of the letters of the text 14 to be copied. As the text 14 is read by reading head 18 the information is stored in the electronic section 20 between the reading head 18 and the writing head 22. The electronic section 20 includes a battery section 30 for batteries 36 and a memory 32.

The line of text 14 to be copied is scanned by manually moving the electronic pen 10 over it, as shown in FIG. 1A. The line of photo sensors within the pen is oriented vertically, so that each sensor sweeps a horizontal line, and many lines are swept simultaneously. The sensors, and hence the sweeping horizontal lines, are spaced sufficiently close to one another so as to provide sufficient detail. Perhaps 8 to 10 sweeps across a letter may be required.

As the electronic pen 10 is scanned over the text 14 variations of light are sensed by the optical sensors which are typically semiconductor diodes or phototransistors. The corresponding signals are stored in random access memory (RAM) 56. Memory 56 has words with as many bits as there are sensors. That is to say, all signals are stored in parallel. The addresses under which these signals are stored are determined from the angular position of a position—determining wheel or cylinder 26 which rolls over the paper 14 as the pen 10 is swept across it. Rolling wheel 26 also helps in guiding pen 10. Angular spaced marks 46 on wheel 26 are optically detected in a manner similar to that used for the information being scanned. Corresponding signals activate a counter 62 which in turn addresses memory 56. Marks 46 are angularly spaced sufficiently close so as to correspond to the horizontal linear spacing on paper 14, roughly equal to the vertical spacings determined by the spacings of the sensors. After the scan the information is stored in memory 56. This information can be used immediately for writing or it can be left in storage for as long a period as desired.

In the writing or printing mode the electronic pen 10 is turned over so that the thermal writing heads 22 are in contact with the paper. A thermally sensitive paper is used for reproduction purposes. Such papers are in common use in many applications and are available in rolls of various widths. In the writing mode the pen 10 is again manually swept across the paper. Another position locating wheel 28 is provided at the writing end of the pen 10. It has identically spaced marks 68 that provide signals as the wheel rolls over the paper 14. These signals activate a counter 62 (which can be the same as that used in the reading mode) which in turn addresses memory 56. Hence, successive addresses are activated and the corresponding outputs from the memory 56 activate the heater elements 60. All of the heater elements 60 are activated in parallel. In effect there is an individual channel for each of the fine lines being scanned, the channel comprising a sensing diode fed by fiberoptic lead 48, an appropriate amplifier 50, lead 51, one bit of a word of memory 56, lead 57, output amplifier 58, lead 59 and a heater element 60. All of the circuitry, including the diodes are fabricated by large scale integration (LSI) technology. Heater elements 50 may also be made as part of the integrated circuits, or may be physically separated from the circuitry. It is evident that the original text 24 is reproduced, since the dots resulting from the heat of the elements 60 have the proper vertical location (since the heaters 60 are spaced exactly as the sensors 48) and the proper horizontal positioning (since the positioning depends on the rolling and marked spacings 46 and 68 on read wheel 26 and write wheel 28 respectively).

The manual sweep across text 14 can proceed at any speed since the horizontal location is monitored by position wheels 26 and 28. On the other hand, in the reading mode the pen 10 has to be guided to insure that the pen covers the desired line. To avoid the necessity for very exact manual guiding more channels than those necessary for adequate resolution may be used. For example, 16 or 32 channels could be used while only 8 to 10 channels are sufficient to resolve typewritten text. In the writing mode the guiding of the instrument is not critical since the text 24 will appear where the pen is being guided and its absolute location is not very important as long as it does not interfere with lines previously written by the electronic pen 10.

The number of lines per millimeter required for good rendition of printed and typewritten material, as well as for handwriting, has been extensively studied for facsimile and other text producing machines. It turns out that five lines in the horizontal and in the vertical direction are ample for the smallest commonly used text.

In the present application, by way of illustration, it is assumed that the sweep is approximately 6 millimeters in height. This height is sufficient to take care of titles or other letters of greater size and also insures a relatively easy guiding of the instrument over lines of ordinary print. At 5 elements per millimeter this would correspond to thirty sweeping sensors 48 and thermal elements 60.

If we assume, by way of illustration, a sweep of 20 centimeters, the total number needed to be stored in memory 56 per sweep turns out to be:

$$32 \times 5 \times 200 = 32,000 \text{ bits}$$

Hence a 32K memory 56 is required per sweep. For convenience it may be desirable for the electronic pen 10 to read two sweeps before writing. This is possible with a memory of about 64K. With LSI technology it is relatively easy to house such a memory 56, together with its access circuitry, within the volume of a case 16.

Desirable characteristics for the memory are low operating and standby power and small physical size. The operation is very slow, hence there are no requirements for speed. In fact, the information is accessed serially, hence there is no need for random access. Possible memory types thus include the following well-known types:

(a) MOS LSI Dynamic memories; or
(b) CMOS Static memories; or
(c) CCD MOS LSI memories.

As examples of these three possibilities the following commercially available types can be employed effectively:

(a) Texas Instruments TMS 4164 JDL MOS LSI Type 65k×1, requiring a 5 volt supply, 125 milliwatt operating and 17.5 milliwatt standby power;
(b) RCA CMOS LSI Memory MWS 5114 having 1K×4, requiring 20 milliwatts operating and ½ milliwatts standby power, using 16 such chips for a 64K total capacity would require 320 milliwatts operating power and 8 milliwatts standby power; and,
(c) Texas Instruments CCD MOS LSI 65k×1 Model TMS 3064 JDL requiring 240 milliwatts operating power and less than 1 milliwatt standby power. This memory has 32 circulating loops that could all be tapped in a 32×2K mode, though it could also be used in an unmodified mode with suitable outside circuitry.

Whatever the choice, it is evident that the operating power of the memory would be ⅓ watt or less. Estimating the duration of the sweep to be about 3 seconds, the operating energy for the memory is about 1 joule per sweep.

Thermal heads have been the object of a great deal of development in recent years. Heads made of thin film metalic heaters are widely used. So are heads made integrally with silicon chips. Power and energy requirements vary somewhat with the technique used as well as with the size of the heads and the resulting contrast in the printing. However, an energy requirement of 3 joules per square centimeter is representative of the energy required.

One sweep of an area of 6 mm×20 cm or 12 square centimeters will blacken it at most by a fraction. Because the spaces between dots are approximately equal to the dots, at most a quarter of the area can be blackened. Further, it is unlikely that the reproduced text would use more than one third of all possible dots. Hence, the effective area to be blackened is about 1 square centimeter and hence requires about 3 joules per sweep.

A source of illumination 40 has to be provided for reading the text 14 to be copied. Because the sensing elements 48 must be in very close proximity to paper 14, the use of ambient light is precluded even if it were intense enough. A 1 watt light source is more than ample. Hence with a 3 second sweep it can be assumed for simplicity that the energy requirement for recording and for printing are about equal (i.e. 3 joules per sweep).

Since the memory mode requires 1 joule per sweep, the total energy per one recording and one printing sweep is 8 joules.

Various types of batteries 36 can supply sufficient energy for many sweeps. For example, a nickel-cadnium cell made by Eveready, Type HS 4133 is usable. This battery is a 1.2 volt battery, 11.9 millimeters in diameter and 31.2 millimeters in length. In intermittent use its storage capacity is about 5,400 joules. The electronic pen 10 can easily contain three such batteries 36. The memory, normally requiring 5 volts, will still operate at 3.6 volts, albeit in a slower, yet still much faster than needed mode. Hence the total energy available between recharges of the battery is 16,200 joules. This energy is sufficient for more than 2,000 sweep pairs. This specific example shows that batteries having sufficient energy storage for many sweeps can in fact fit within a penlike device. Other types of usable batteries include nonrechargable primary batteries. The estimates of resolution, moving capacity and power are valid for all embodiments of this invention.

The electronic pen depends upon three technologies that have been well developed in recent years, namely (1) hand-held code reading heads; (2) LSI semiconductor memories; and (3) thermal heater heads.

Hand-held reading heads have been developed for reading code bars on various articles of commerce. These devices typically have only one channel but their principle can be extended to devices with multiple parallel reading channels. All heads have a source of light and a sensing element. They tend to differ in the arrangement of the light source and the sensor, some having the light source closer to the paper and the sensor further away, others have the disposition the other way around. The light source is typically either an incandescent light or a light emitting diode (LED). Sensors tend to be photodiodes. Several of these arrangements are described in the patent literature including U.S. Pat. Nos. 3,417,234; 3,784,794; 3,868,514; 3,985,999; 3,976,973; and 4,115,703. Hand-held readers with multiple parallel channels have also been developed for reading characters, especially characters generated by computer. One particular head, described in U.S. Pat. No. 3,918,028, uses one row of optical fibers for illumination and another adjacent row for sensing.

The development of LSI semiconductor memories is one of the best known developments in modern electronics. Thousands of bits of memory are now available in a very small volume. They require very little power and can be bought for little money. It is this development above all that makes the concept of the electronic microcopier practical.

Thermal heads and thermally sensitive paper have been perfected in recent years. Many products use thermal printers. Many of those products that use thermal printers are portable and battery operated. Most thermal heads are of the matrix type and are adapted to print characters. Some, developed for facsimile, chart printers, etc., use a row of heaters. The latter type is of particular interest with regard to the present invention.

In the first embodiment, reading head 18 employs two bundles of optical fibers, in a manner somewhat similar to that described in U.S. Pat. No. 3,918,028. One bundle 42 illuminates the paper 14 and the other bundle 48 picks up the scattered light from paper 14. The ends of fibers 42 and 48 are arranged in two rows, each fiber of the illuminating bundle 42 facing a fiber 48 in the sensing bundle. This arrangement is clearly illustrated in FIGS. 3A, 3B, and 4. The ends of the fibers are maintained at a small distance "h" from the surface of the paper 14. Typically the fibers 42 and 48 have a diameter of about a tenth of a millimeter (125 to 150 microns), and their axis are spaced 0.2 millimeter (200 microns) apart, both along the row and between the rows. The distance "h" between the end of the fibers and the surface of the paper 14 is approximately equal to the diameter of the fibers, that is about 125 microns. The ends of the fibers are held in perforations at the bottom of a housing 80 which also holds the illuminating lamp 40 and wheels 26 and 27. With this arrangement each sensing fiber 48 picks up the light scattered directly underneath its end and essentially no light scattered from adjacent areas underneath neighboring fibers 48.

Figure 2A:
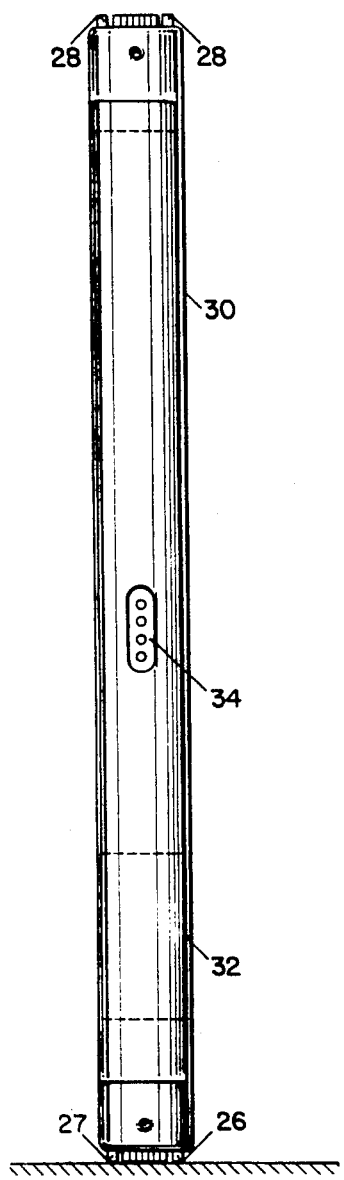
FIG. 2A is a vertical elevation of the preferred embodiment illustrated in FIGS. 1A and 1B.
Figure 2B:
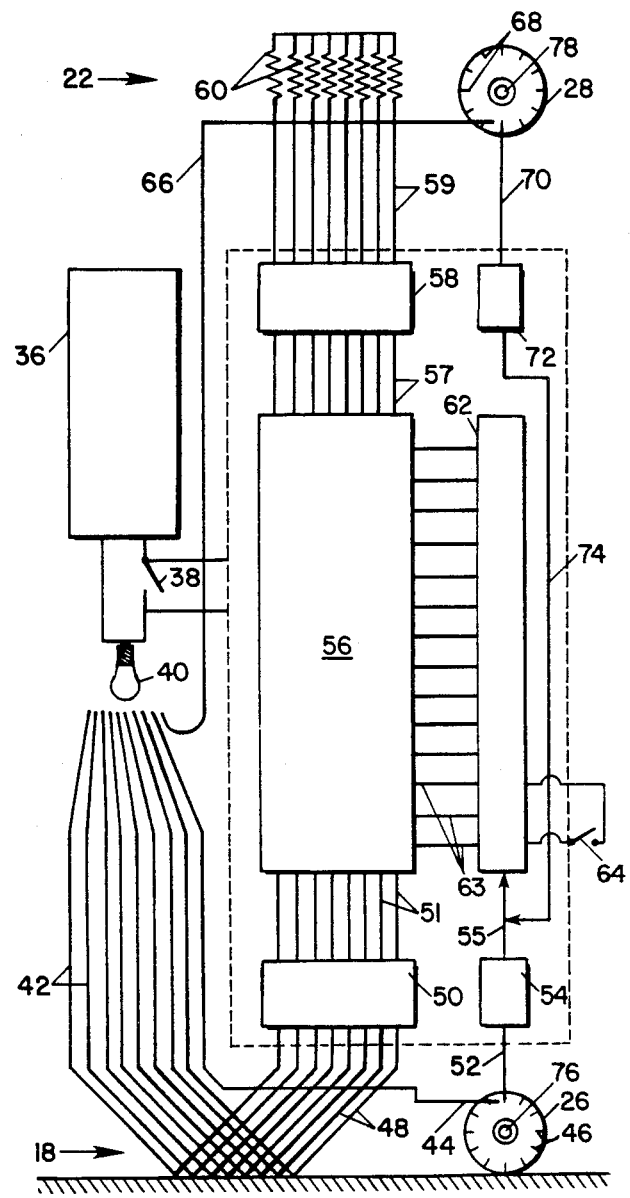
FIG. 2B is a general electronic schematic view of the preferred embodiment of the invention.
Figure 3B:
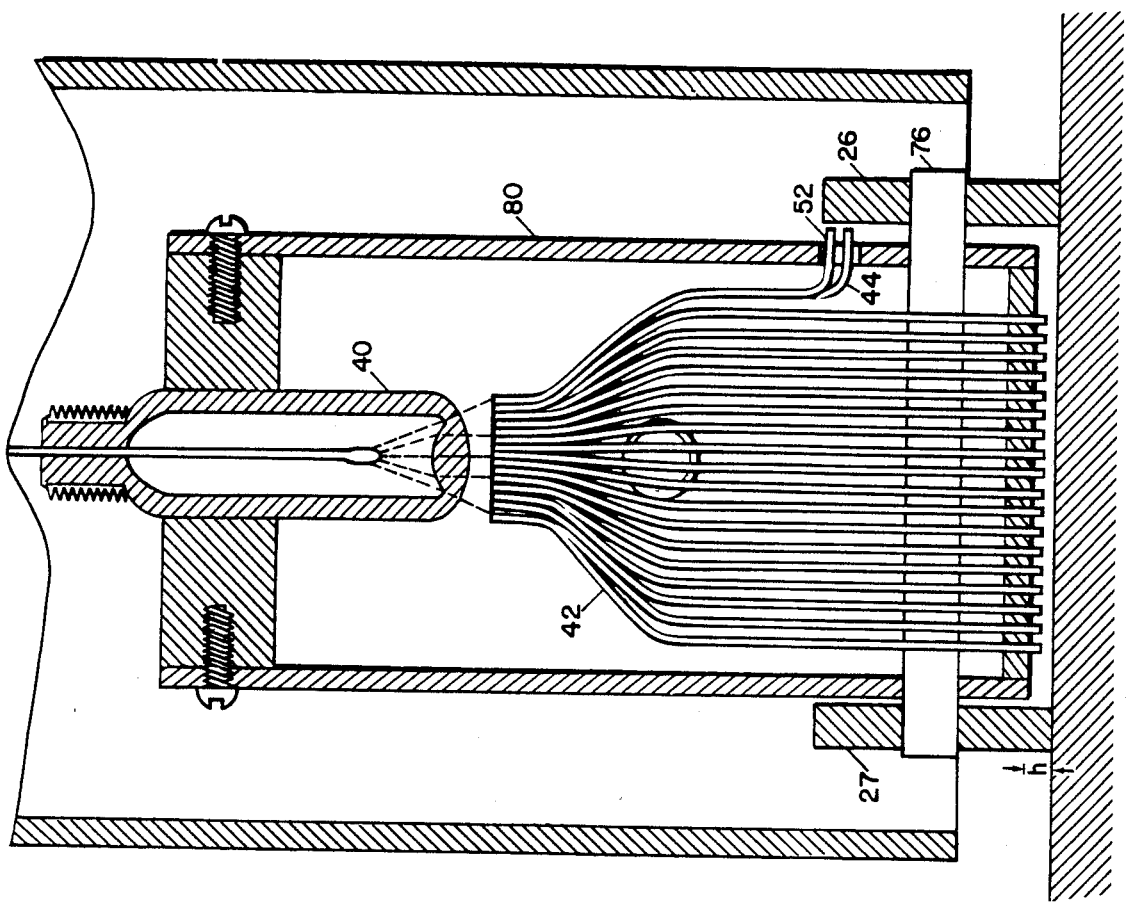
FIG. 3B is a front cross sectional view of the preferred embodiment of the invention.
Figure 3A:
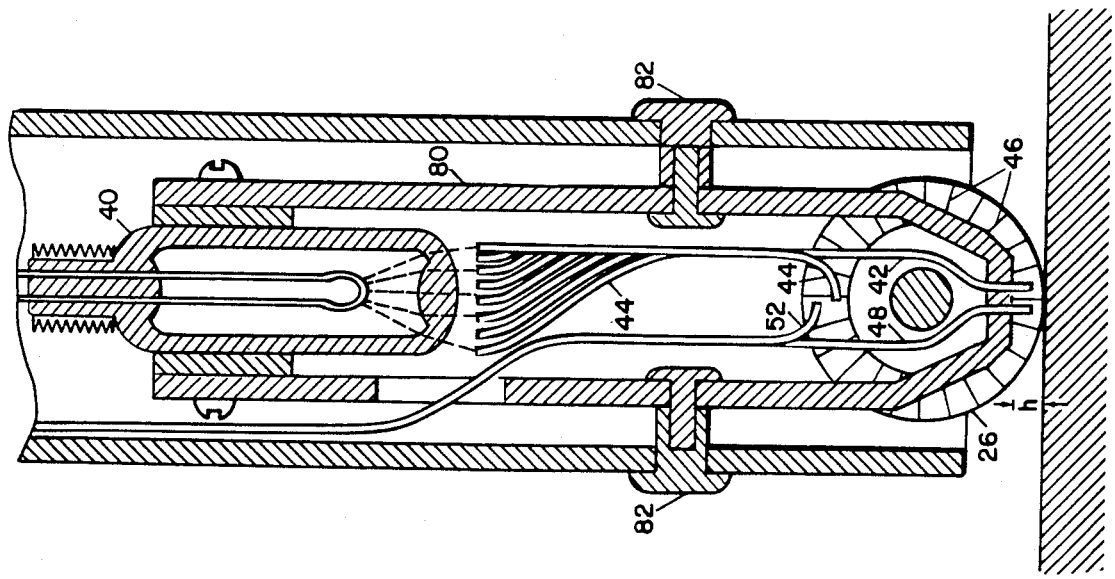
FIG. 3A is a side cross sectional view of the preferred embodiment of the invention.
Figure 4:
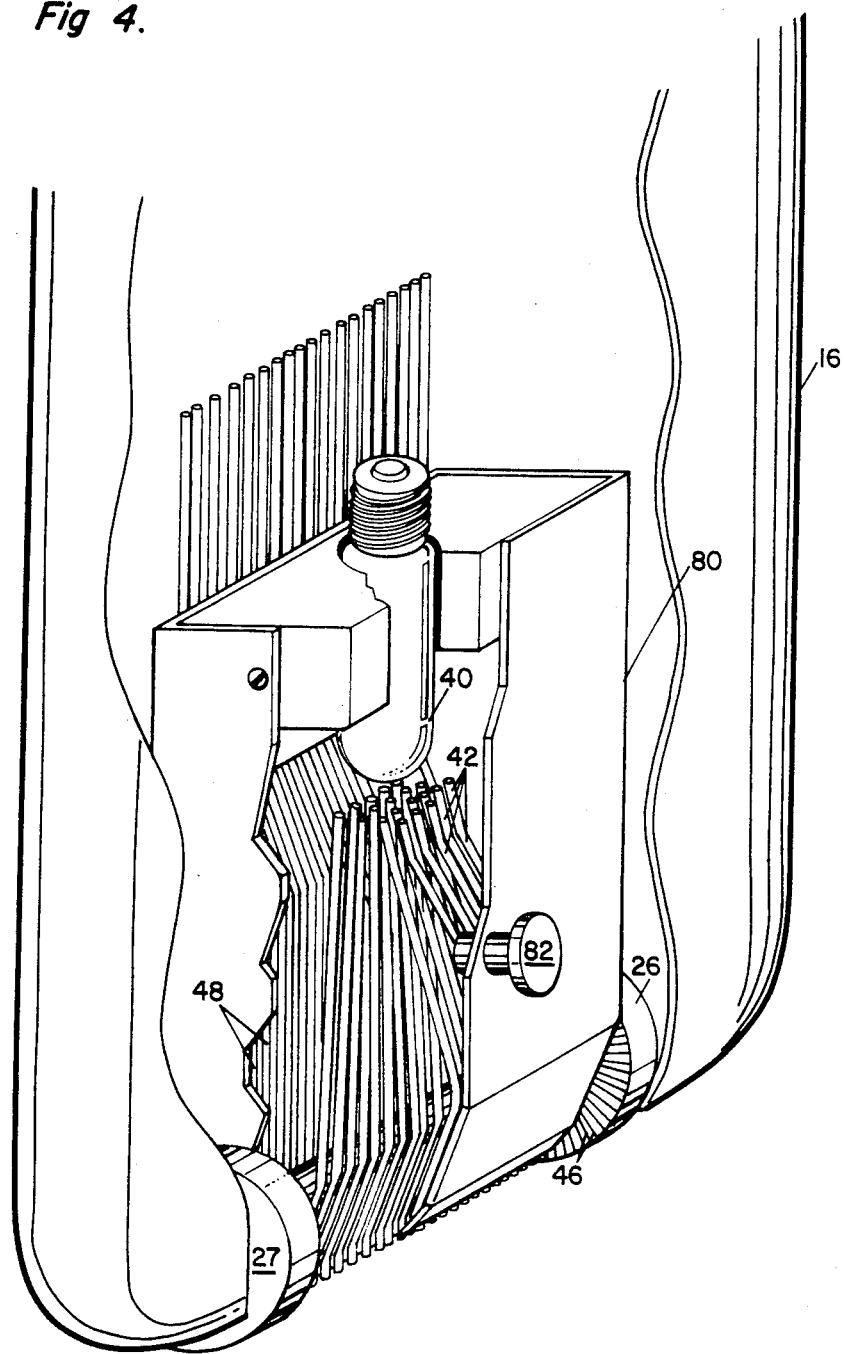
FIG. 4 is a perspective partial cross-sectional view of the reading head of the preferred embodiment of the invention.
Figure 5B:
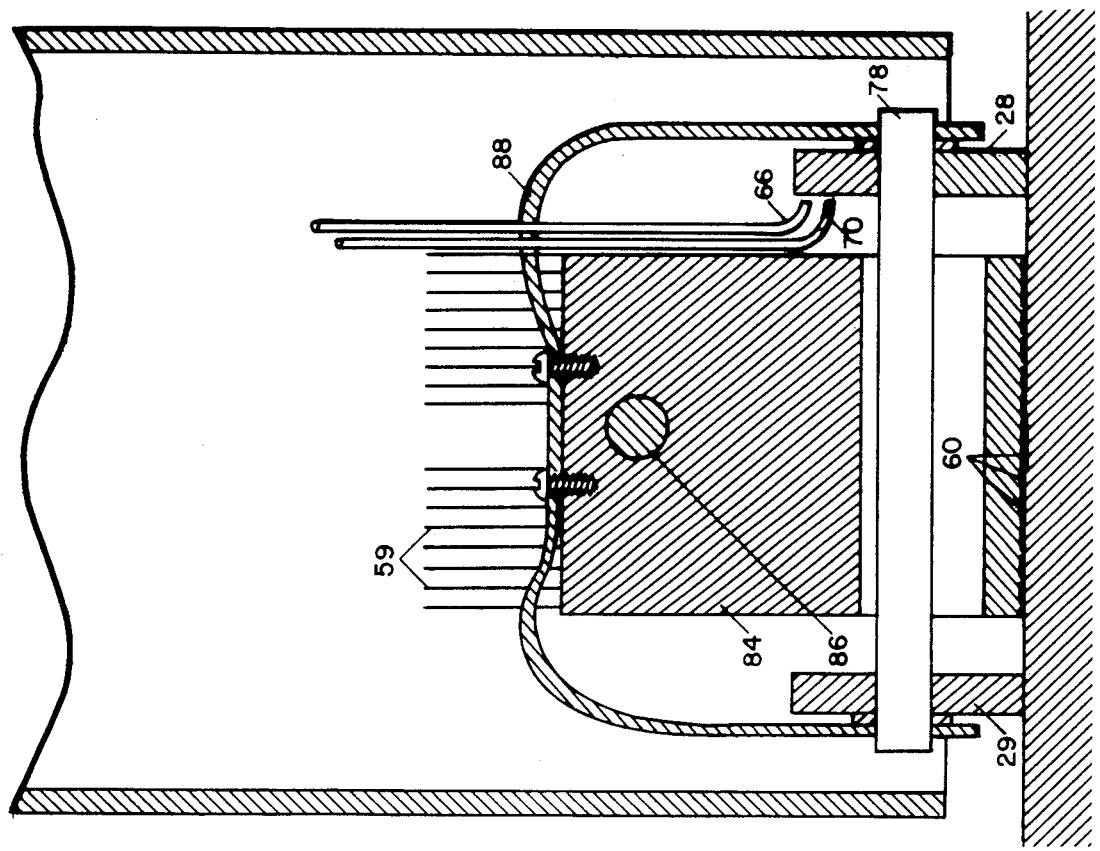
FIG. 5B is a front cross-sectional view of the writing head according to the preferred embodiment of the invention.
Figure 5A:
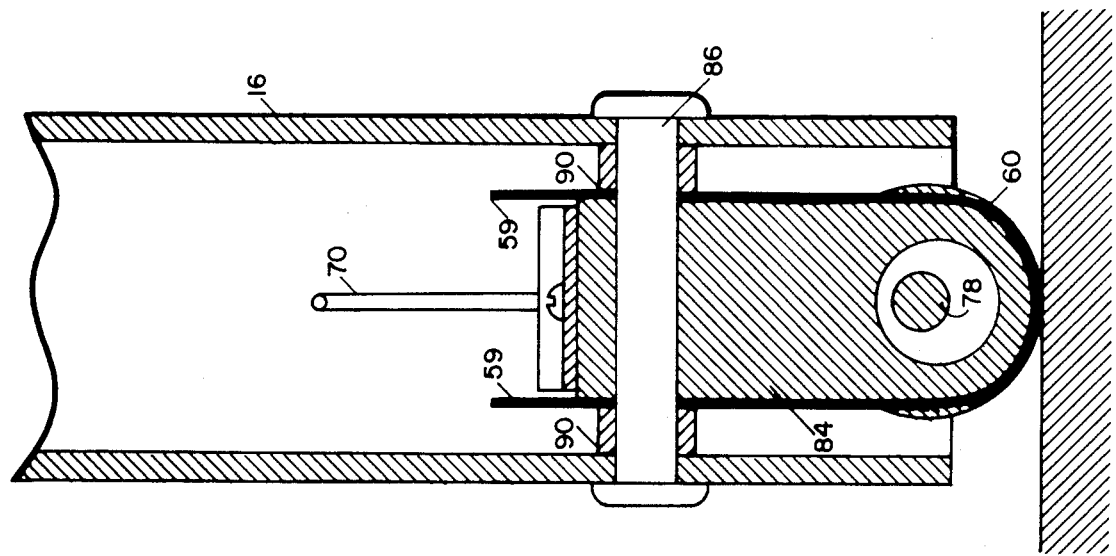
FIG. 5A is a side cross-sectional view of the writing head of the preferred embodiment of the invention.
Figure 6:
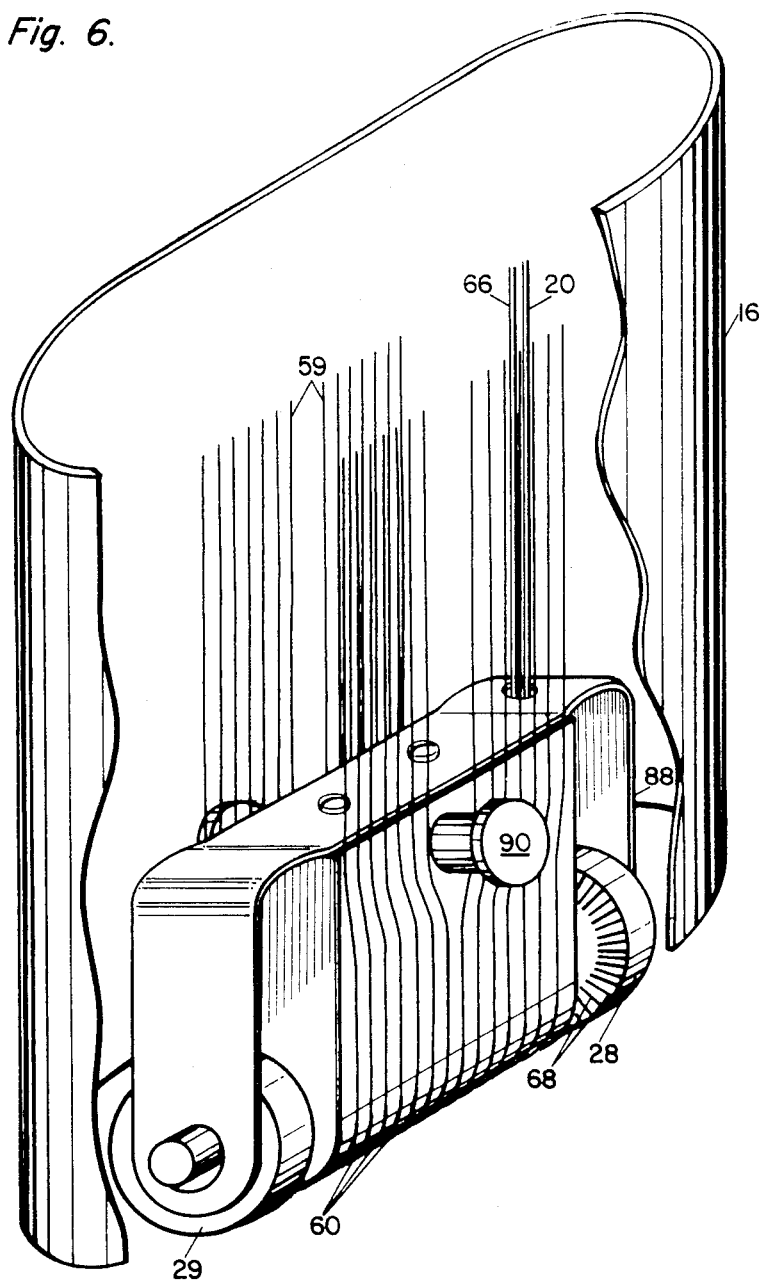
FIG. 6 is a perspective partial cross-sectional view of the writing head of the preferred embodiment of the invention.

The fibers 42 and 48 are bent so as to allow the axel 76 of wheels 26 and 27 to pass between the two bundles. The other end of the illuminating fibers 42 fan out into several lines, that is to say, into a regular array. According to the preferred embodiment there are 32 pixels or elements being scanned simultaneously, hence 32 illuminating fibers 42 and 32 sensing fibers 48. The regular array in which the illuminating fibers 42 fan out is typically 6×6 with four vacancies. This is illustrated in FIGS. 3A–4. Incandescent light source 40 including a crude molded lens on its end provides the illuminating light. Lamp 40 is held inside of housing 80. The bundle of sensing optical fibers 48 pass through a window in the housing 80. The ends of the sensing fibers 48 abut against a row of photosensors. The photosensors and their amplifier 50 are preferably part of a single chip, and therefore the photosensors are not schematically illustrated. The outputs of amplifier 50 are fed in parallel via leads 51 into memory 46. There are 32 parallel channels in the preferred embodiment. For illustrative purposes only 16 channels are shown in FIGS. 3A–6 and only eight channels are shown in FIG. 2B.

The two wheels 26 and 27 insure the proper spacing "h" between the ends of the fibers 42 and 48 and the surface of paper 14. The wheels 26 and 27 are mounted directly on axel 76 which turns on bearing in the housing 80. This arrangement tends to facilitate the guiding of the electronic pen 10 in a straight line. The interior side of wheel 26 is radially marked with equal spacings 46. The markings 46 are illuminated by optical fiber 44 and sensed by fiber 52 in a manner previously described. The other end of sensing fiber 52 abuts against a sensing diode (not illustrated) integrated into amplifier 54 and fed via line 55 to address register 62. The binary elements of the counter address register 62 feed the address information via leads 63 to RAM memory 56.

In order to insure that wheels 26 and 27 are firmly in contact with the surface of the paper without requiring the operator to hold the electronic pen 10 in a fixed rigid vertical orientation, a gimbal mounting 82 is provided. Gimble bearings 82 connect the read head housing 80 to the exterior pen case or barrel 16. According to this arrangement the pen 10 can be inclined around the axis of wheels 26 and 27 without substantially changing the distance "h" between the ends of the fibers 42 and 48 and the surface 14 of the paper. Similarly, the electronic pen 10 can be inclined in a direction perpendicular to the sweep, as the main body rotates. In other words, the housing 80 can be arbitrarily oriented with respect to the pen barrel 16, and yet by pressing the pen 10 downward on paper 14 the operator 12 insures that both wheels 26 and 27 are in firm contact with the surface of paper 14. Therefore, the ends of the illuminating fibers 42 and sensing fibers 48 are spaced just right with respect to the surface of the paper 14. The pressing of the pen insures also that the wheels 26 and 27 will turn as the electronic pen 10 is being swept and that thereby the position of the pen 10 can be reckoned by counting the passages of the angularly spaced markings 46 on read wheel 26.

The writing head 22 utilizes a row of heater elements 60 mounted on the cylindrical surface of a ceramic body 84. A discussion of a relevant prior art device can be found in U.S. Pat. No. 4,030,408. According to the preferred embodiment the ceramic body 84 is a rectangular paralelepiped having a half cylindrical end. There are half-cylindrical shallow grooves in the half cylinder. Metalic thin layers are deposited in the grooves. For example, thin layers of nichrome can be used. These metal layers comprise the heater elements 60. To protect against wear the metal films are covered by very thin layers of SiO or $SiO_2$. Thicker low resistance metal contacts are made to the heaters and connections on the side of the ceramic block 84 are provided. Through these connections the heaters 60 are energized by the output of amplifiers 58 through leads 59. The input leads 57 comprise the outputs of memory RAM 56. According to the preferred embodiment there are 32 channels, i.e. 32 heaters 60 and 32 amplifiers 58. For simplicity only 16 heaters 60 and 16 connections 59 are illustrated in the figures.

A gimbal mounting comprising axel 86 and axel bearings 90 as one axis and axel 78 as the other provide for freedom of movement for the write head 22 in the same manner as freedom is provided for the reading head 18. Accordingly, the ceramic block 84 can have any orientation with respect to pen barrel 16 since the two components can rotate with respect to one another about the two perpendicular axes of rotation. For thermal writing the heaters 60 must be in intimate contact with the paper. According to the preferred embodiment this intimate contact is insured by the downward pressure placed on the electronic pen 10 by the hand 12 of the operator. In order to insure that the position indicating wheels 28 are also pressed against the paper 14, the axel 78 is mounted on a leaf-spring 88 attached to the ceramic block 84. Axel 78 passes through a clearance hole in ceramic block 84. The gimble mounting insures that a downward pressure on the pen 10 will cause the bottom end of the cylindrical ceramic to be in contact with the paper 14 along its entire length. Read wheels 26 and write wheels 28 have the same diameters and the angular markings 46 and 68 on the inside of those wheels are identical in spacing.

The hand-held copier 10 of the present invention requires electronics in order to make it work. The required electronics include a bank of 32 (actually 34) photosensors and amplifiers 50 and 54, a counter and memory address circuit 62, a memory with a minimum capacity of 32K bits and preferably 64K bits or more 56, a bank of 32 output amplifiers 58 and 32 heaters 60.

Some controls and switches 38 and 64 are also required. Generally all of the electronics required for the successful operation of the preferred embodiment 10 are within the state of the known art. In fact, the device can be constructed with components available on the market. Several different modifications of the design can be made. No detailed description of the electronics is required, hence the construction of the pen 10 would be within the skill of one or ordinary skill in the art given this disclosure.

After allowing for batteries 36 there is still ample space for the remaining electronics 20. The barrel 16 of the pen 10 preferably comprises a flattened cylinder about 13 to 15 millimeters wide, 6 to 7 millimeters thick and about 18 centimeters long. The batteries 36 of the type chosen preferably occupy a height of about 9.4 centimeters. The reading and writing heads 18 and 22 take up about 2.5 centimeters. Hence the volume available for electronics is approximately 60 mm × 7 mm × 15 mm. In that volume several chips can be contained even if used in a standard package with two rows of in-line pins, especially if the pins are slightly shortened.

Provisions must be made to set the electronic pen 10 in either the reading mode or the writing mode, to turn it off, and to insure that in the writing mode the memory 56 is read out from the original address used in reading. These various functions can be controlled by manual switches 38 and 64. The switch 38 can be in the "off position", the read position, at the end of which the memory is holding information due to stand-by power, and the C or zero set position bringing the memory counter to a fixed initial address. Such a manual switch 38 is perhaps the most direct way to provide for mode selection. Actually, it may be preferable to have no switches for the operator to be concerned with. One way to accomplish this is through sensing the pressure of the reading and writing heads 18 and 22 on paper 14. Such sensing can be obtained by mechanical micro-switches or else by solid-state strain gauges. The setting of the memory address register 62 to its initial or zero state may, for example, be controlled by the intial pressure of the writing head or the first signal resulting from the turning of write wheel 28. When neither the reading nor the writing heads 18 and 22 are activated by their respective switches, the memory 56 is automatically in its holding state, as maintained by the small holding power required.

In recent years many different types of reader heads have been developed for reading bar codes. In one type a lens focuses scattered light from the paper onto a photosensor, the illumination being provided by two bulbs close to the paper as described in U.S. Pat. Nos. 3,985,999 and 4,115,703. A more efficient use of light is achieved by focusing the light of an LED and also focusing the resulting scattered light from the paper as is done with two adjacent molded lenses in an arrangement similar to that described in U.S. Pat. No. 4,143,809. Optical fibers are also known to be used to direct light to a photosensor, while the illumination is achieved in a lens-less environment as described in U.S. Pat. No. 3,868,514. Moreover, a system of illumination in which one fiber bundle provides the illuminating light and another fiber bundle achieves the sensing function is described in U.S. Pat. No. 3,918,028. In yet another arrangement, a spherical lens focuses the light from a point source to the paper. The scattered light passes back through a lens and part of it is captured by a photosensor tangent to the spherical lens. Though considerable light is lost by the shadowing of the photosensor and the loss of scattered light not reaching the photosensor, still the arrangement has the merit of simplicity. This particular arrangement is described in U.S. Pat. No. 3,784,794.

Similarly, in recent years, many thermal printer heads have been developed for many applications. These include high speed non-impact printers, facsimile machines, printers for cash registers, output for computers, minicomputers or even hand held calculators. Many thermal heads utilize thin metal films as their heaters. See for example the disclosures in U.S. Pat. Nos. 3,984,844; 3,862,394; 4,030,408; and 4,105,892. Some embodiments employ thick metal wires as disclosed in U.S. Pat. Nos. 4,203,025 and 4,027,311. More recent disclosures describe thermal heads that are made integrally with the circuits that drive them through the means of LSI technology. Most of these tend to be matrix types, that is, there is an array of typically 5×8 or greater of heaters that can be selectively energized so as to "print" a character. Examples of such matrix thermal heads are described in U.S. Pat. Nos. 3,988,569 and 4,110,598.

Within the integrated chip, the ohmic heating elements themselves consist of thin metallic films. In other designs the heaters are made of the semiconductor itself in which proper impurities have been diffused. The patent and the technical literature on thermal printing heads described many engineering trade offs, including: resolution, speed, power efficiency, wear, cost, etc.

According to the preferred embodiment, a wheel is located at each end of the electronic pen 10 to guide the pen and also to reckon its position by optically sensing angular marks on the wheels. Also, the reading head 18 and the writing head 22 are individually mounted on gimbels so as to assure proper contact with the paper and yet allow the necessary angular freedom for the operator 12. These duplications can be eliminated by placing the reading and writing heads at the same end of the electronic pen 10.

A further elimination of duplication resulting from having the two heads at the same end results from a very desirable mode of circuit operation. With a manual sweep of the pen 10, the time spent on each group of pixels is relatively long, that is at least a millisecond or a good fraction thereof. In that time it is easy to sweep over the 32 sensors and deliver in seriatim readings to memory 56. Similarly, the signals to the 32 writing heads can be delivered in seriatim from the memory 56. Seriatim delivery requires only one transmitting conductor whereas parallel transmission of all channels requires multiple connections. A shift register is necessary for these parallel-to-series and series-to-parallel conversions. Only one such register is necessary when the reading and writing heads 18 and 22 respectively are at the same end. Alternatively, the memory itself could be mounted close to the reading and writing heads, possibly on the same chip and thereby eliminate all external connections. This would require one very large and complex chip. At this time the use of a shift register on one chip and the memory on another is more practical.

SECOND EMBODIMENT

Figures 7A, 7B, 7C, 7D:
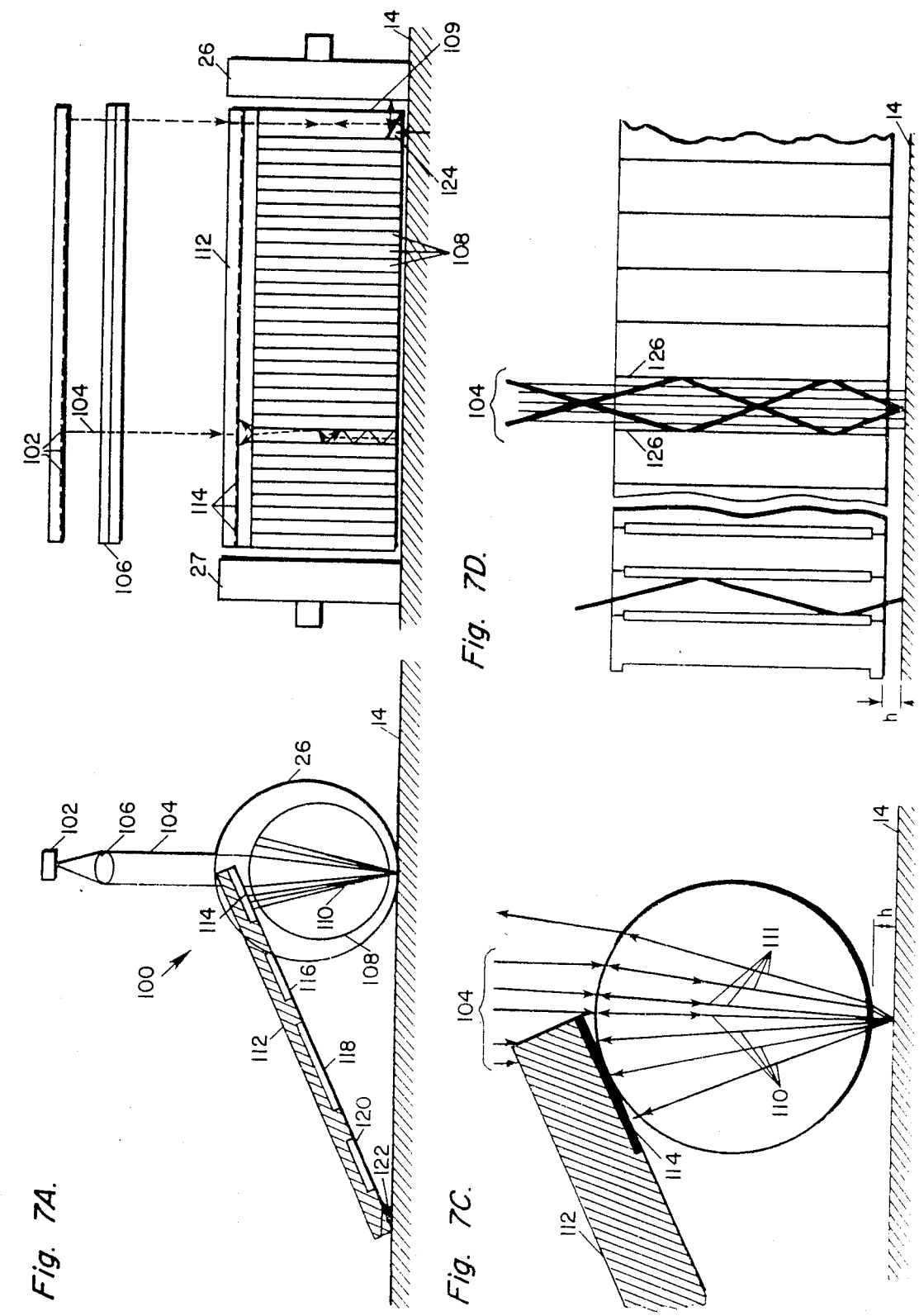
FIG. 7A illustrates an alternative embodiment 100 of the invention which employs a series of cylindrical lenses 108 and an integrated circuit chip 112.
FIG. 7B is a front elevational view of the alternative embodiment 100 illustrated in FIG. 7A.
FIG. 7C is a detail side elevational view of the alternative embodiment 100 illustrated in FIG. 7A.
FIG. 7D is a front detail view of the alternative embodiment 100 as illustrated in FIG. 7A showing the manner in which the incident light rays travel through the cylindrical lenses 108.
Figure 8:
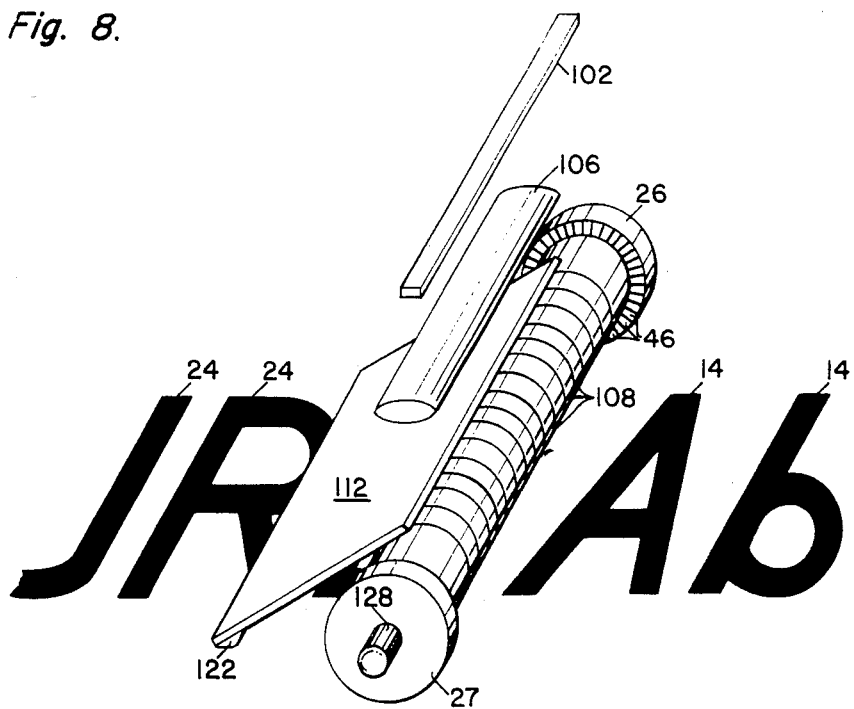
FIG. 8 is an exploded perspective view of the alternative embodiment 100 shown in the operating mode.
Figure 9A:
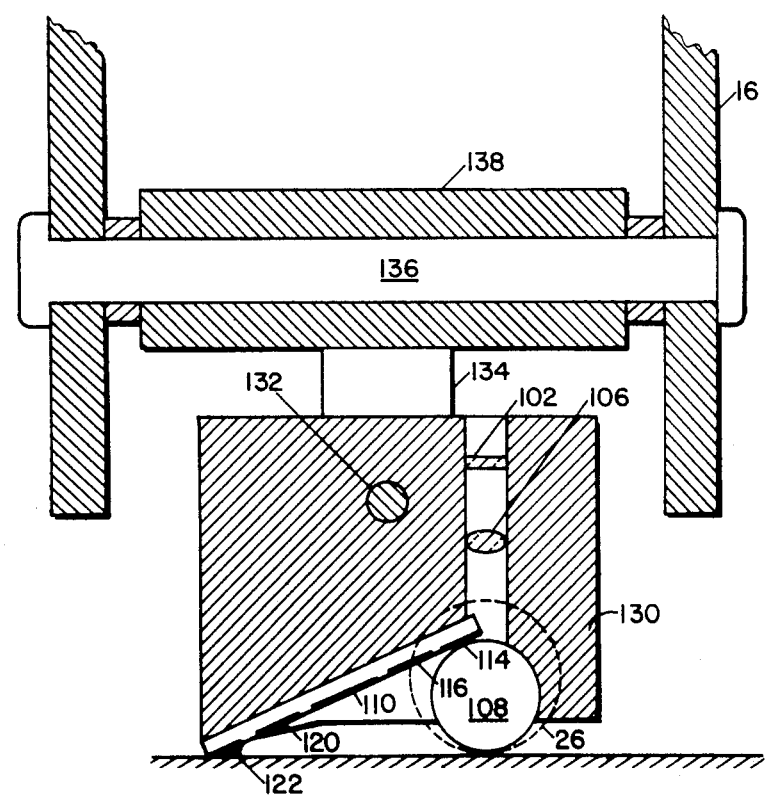
FIG. 9A is a side elevational cross-sectional view of the alternative embodiment 100 illustrating its pivot mechanism with respect to housing 16.
Figure 9B:
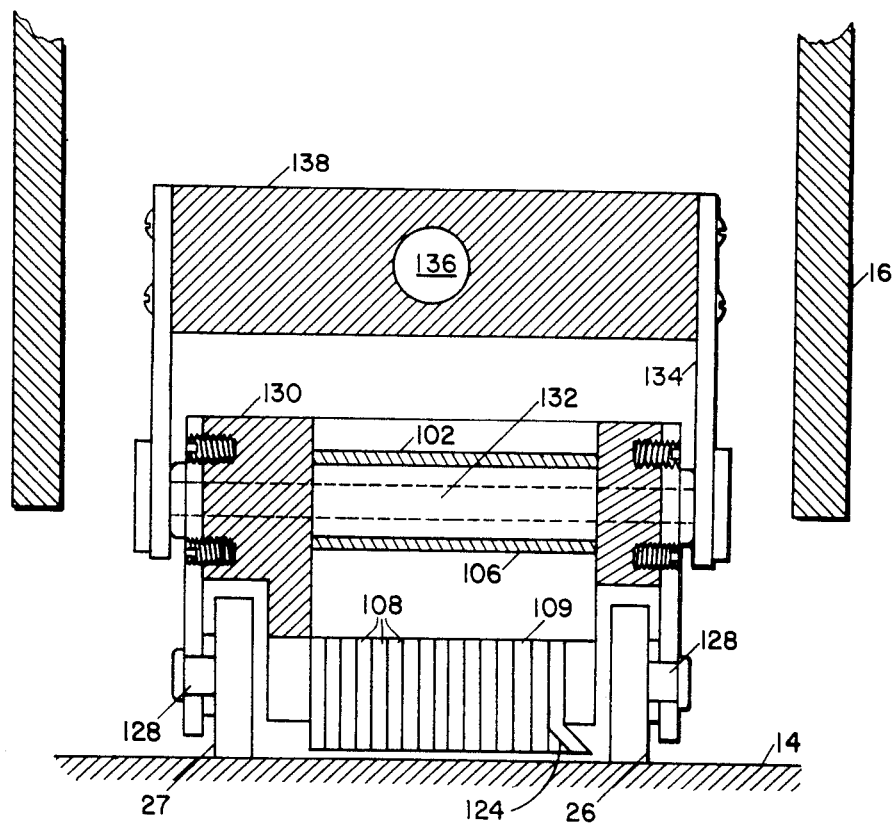
FIG. 9B is a front elevational view of the embodiment illustrated in FIG. 9A.
Figure 9C:
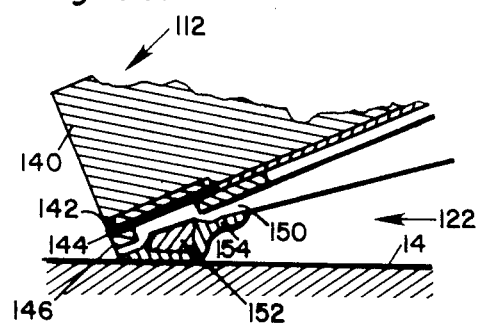
FIG. 9C is a detail view of the writing head 122 and the heater elements 152 of the alternative embodiment 100.

An alternative embodiment 100 of the basic invention 10 is illustrated in FIGS. 7A-9C. FIGS. 7A-7D illustrate the principles of operation; FIG. 8 is a perspective view of the main parts of the alternative embodiment 100 shown without supports or housing; and FIGS. 9A-9C show cross-sections and details of the physical aspects of the alternative embodiment 100.

A series of cylindrical lenses or discs 108 held in close proximity to paper 14 focuses the light 104 from an LED light source 102 onto the paper 14. Since it is necessary to illuminate a line of pixels the light source is preferably elongated. According to the alternative embodiment 100 the light source comprises a line of LEDs 102. A collimating lens 106 focuses the rays 104 through a series of cylindrical disc lenses 108. Part of the light 104 impinging upon lenses 108 is scattered back as rays 110 and blocked by photodiode sensors 114. A discussion of a relevant structure can be found in U.S. Pat. No. 3,784,794. However, the present alternative embodiment 100 differs in that it employs many coaxial cylindrical lenses instead of a single spherical lens. The sides 126 of the individual disc lenses 108 are reflective. This can be achieved by metalizing the flat surfaces 126 as illustrated in FIG. 7D. Alternatively, the natural total reflection of the walls can be exploited as is done with optical fibers. In this case a small space in between the walls of adjacent lenses 108, provided by a small shoulder, would avoid any possibility that the effervescent light from one of the lenses leaks into its neighbor. In any case all light striking a lens 108, even if at some angle from normal incidence, will be confined within that lens 108 and strike a region of paper substantially equal to the width of the lens. Similarly, the light scattered by the paper will be confined by each of the cylindrical disc lenses 108 and illuminate one of a row of photosensors 114. Some scattered light 111 that does not impinge upon photodiode sensors 114 is lost in the process.

The photosensors 114 and their amplifiers 116, the shift register 118, the amplifier 120 for the thermal heads and the thermal heads 122 may all be integrated into a single chip of silicon 112. The chip 112 is held by a supporting block or housing 130 that also holds light source 102, collimating lens 106 and disc lenses 108. Collimating lens 106 may or may not be used depending upon the LED light source 102 provided. Collimating lens 106 makes the collection of light from LED source 102 more efficient. If collimating lens 102 is eliminated, then the LED source 102 would typically be mounted closer to the disc lenses 108. A relevant prior art structure is disclosed in U.S. Pat. No. 3,784,794.

The thermal head 122 can be made as part of the integrated chip 112. However, because the head 122 must have a flat portion parallel to the paper 14 and not to the angularly located chip 112, it may be more convenient to make them by another technique. In particular a possible suitable technique is described in a paper issued at the 1978 Components Conference by Yamazaki and Terashima (P 264-270 of Proceedings). In that technique there is a glazed layer on top of a substrate. Heater layers are mounted on top of the glazed surface. A metal block for each pixel, surrounded by insulating and protective layers, serves to localize the heat and has been shown to increase resolution and minimize the required power. A modified form of that technique is utilized here. The delineated pixel metal blocks are utilized to match the angular difference between the chip and the surface of the paper. A suitable detailed construction of a heater element is illustrated in FIG. 9C. Contacts between one end of the heaters 144 and the integrated chip 112 were made through metal pads that can be evaporated or silk screened.

The block 130 which supports the chip 112, heater 122, collimating lens 106, cylindrical disc lenses 108 and LED light source 102 is mounted on a gimbal. The main body of the electronic pen 100, comprises an elongated housing 16, which can pivot with respect to the supporting block 130 in two perpendicular directions along the axes of axels 132 and 136. Axel 132 passes through housing 130 and is attached to a pair of brackets 134 to a second housing 138. The second axel 136 passes through the second housing 138 and is attached at two points to the barrel 16 of the alternative embodiment 100. Because axel 134 is located between the line of contact of the wheels 26 and 27 and the thermal head 122, a downward force on the case 16 will cause the thermal head 122 and the wheels 26 and 27 to press evenly upon paper 14.

The wheels 26 and 27 are so mounted as to hold the cylindrical disc lenses 108 a distance of "h" of about 150 microns, i.e. less than the pixel size of 200 microns, above paper 14. The width of the light beam 104 is narrowest at that distance, assuming a cylindrical lens diameter of 4 millimeters.

According to alternative embodiment 100, 32 sweep channels are assumed. 32 channels are shown in FIG. 7B as only 16 lenses or channels for the purpose of simplicity. The angular markings on the inner side of wheel 26 are used to reckon the position of the pen 100 on the paper in both the reading and writing modes. To count these markings an extra lens (the 33rd) is used. At its lower end it is cut at 45° to provide a reflecting surface 124 so that light 104 can be scattered to the side and illuminate the markings 46 on wheel 26. The scattered light from the markings 46 reflects again onto the 45° surface 124 and passes to the lens to strike an extra (the 33rd) photosensor. Wheel 26 provides the function of position location for both reading and writing. One axel 128 attached to housing 130 is for wheel 26 and another axel 128' is for the idling wheel 27.

Heater 122 is illustrated in detail in FIG. 9C. It includes the following elements: a substrate 140, a glazed layer 142; a heater 144; a conductor metal 146; additional metalization 148; electric isolation 150; heated metal 152 and a protective layer 154 preferably comprising $SiO_2$.

THIRD EMBODIMENT

It is also possible to make the photosensors, thermal writing heads, amplifiers and shift registers, all on one integrated silicon chip 212. An alternative embodiment 200 of the present invention is illustrated in FIGS. 10 through 13. According to embodiment 200 an abutting gallium arsenide chip carries the LED light sources. Silicon and gallium arsenide chips are in direct contact with paper 14. This simple structure requires no lenses and utilizes light efficiently.

Figure 11:
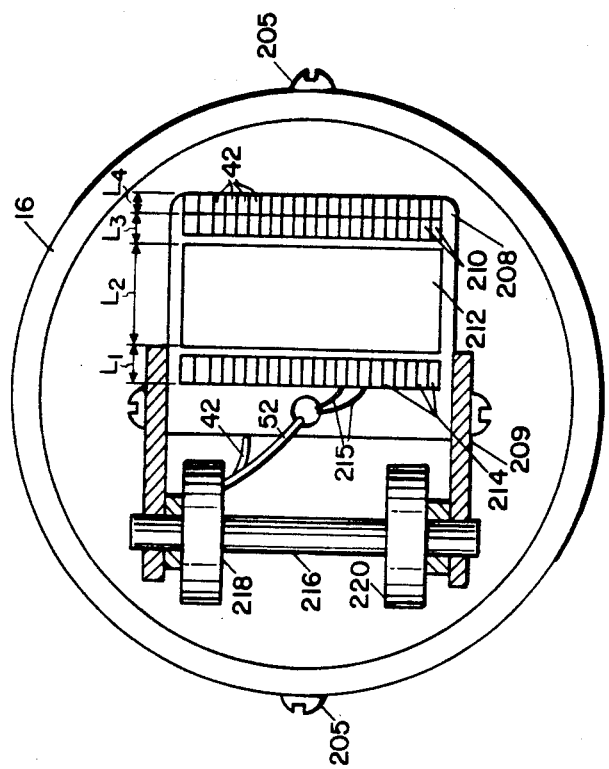
FIG. 11 is a bottom plan view of the alternative embodiment 200.
Figure 10:
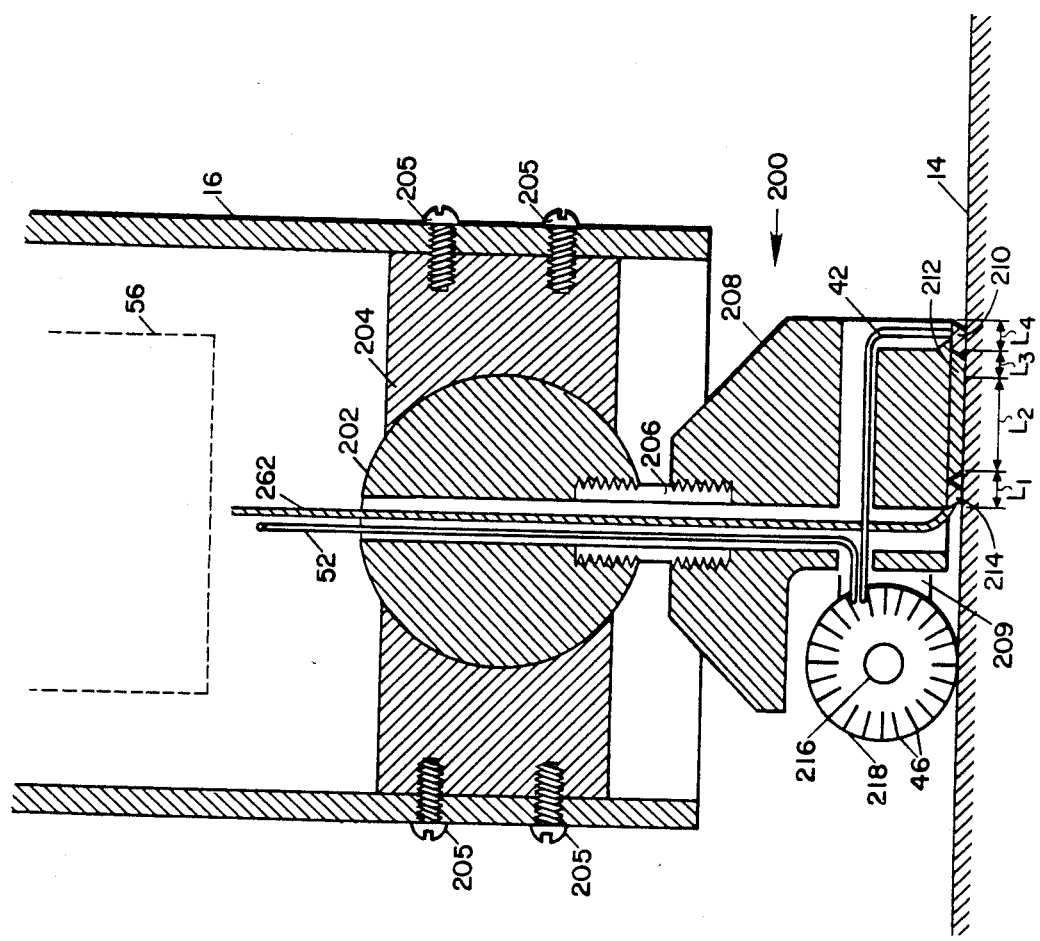
FIG. 10 is a side elevational, cross-sectional view of an alternative embodiment 200 in which the reading and writing heads are integrated into a single unit.

A cross-section of the microcopier pen 200 is illustrated in FIG. 10. The silicon chip 212 and the abutting gallium arsenide chip 210 are fastened to a substrate holder 208 which also carries two wheels 218 and 220. Wheel 218 serves the purpose of reckoning the position of the pen during the read and write functions. Wheel 220 is connected to wheel 218 by axel 216. The two wheels help in guiding the pen. Axel 216 is rotatably connected to arms 209 which are fastened to housing 208. Housing 208 is carried by a spherical ball 202 which is trapped in a cavity in vice 204. Screws 205 hold the vice 204 and hence the ball 202 in position within case 16. A hollow threaded stud 206 communicates the rotatable ball 202 to the housing 208. Ball 202 is free to rotate in such a way as to insure the smooth even contact of wheels 218 and 220 and chip 212 against the surface of paper 14. Thermal heads 214 are located to the rear of chip 212. The thermal heads 214 and the circuitry integrated into chip 212 and diodes 210 are communicated by a bundle of leads 215 upwards through ball 202 to the memory section 56 and other portions of the microcopier. Illumination of angular markings 46 is accomplished by feeding back a portion of the output of diodes 210 through optical fiber 42. The sensing of the illuminated markings 46 is through optical fiber 52 which, like leads 215, passes through ball 202 into the electronic portion of the alternative embodiment 200. FIG. 11 is a bottom plan view illustrating the features just described with respect to FIG. 10.

Figure 12:
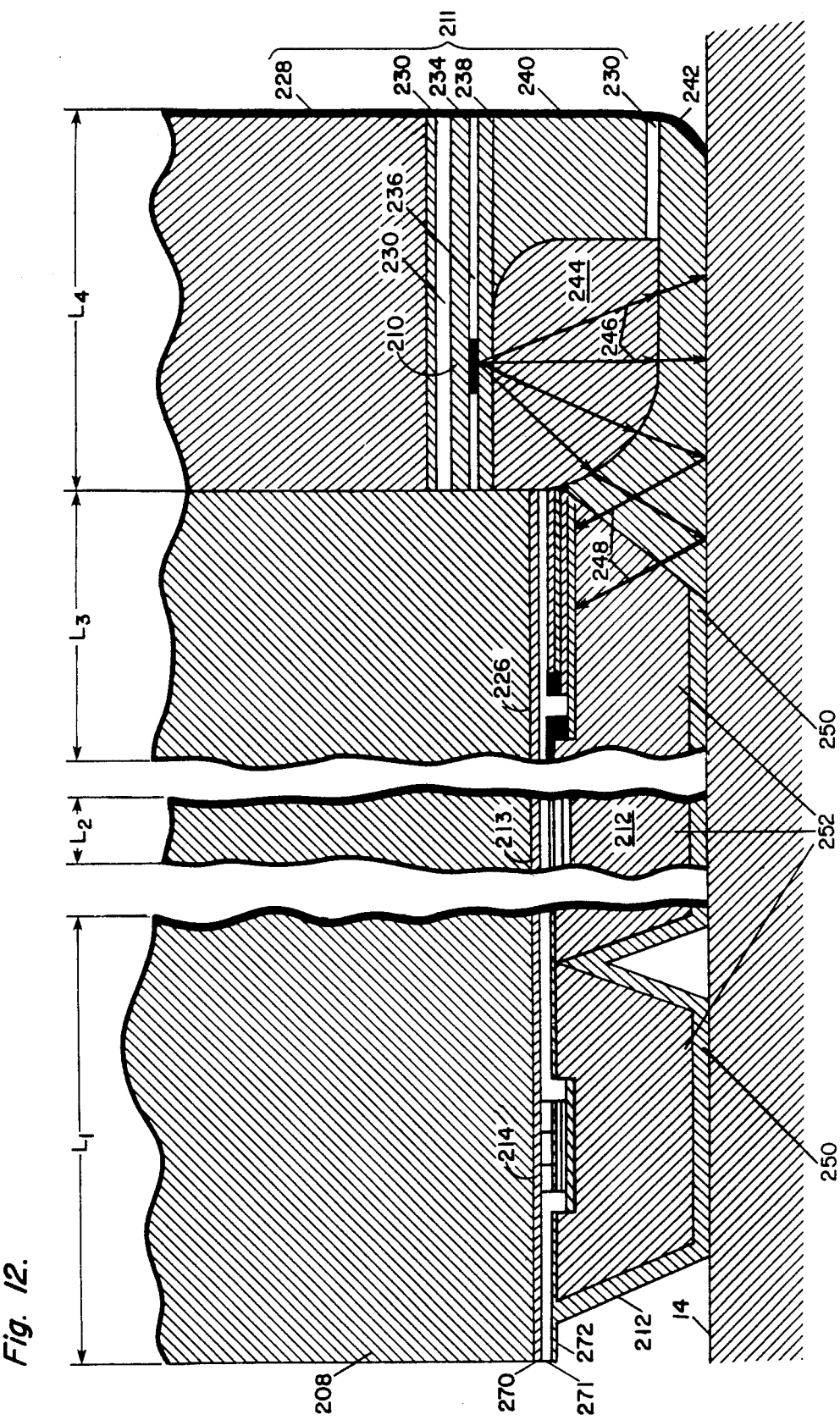
FIG. 12 is a side elevational detail view of the integrated reading/writing head according to the alternative embodiment 200.

FIG. 12 is a schematic cross-section of the silicon chip 212 also illustrating the abutting gallium arsenide chip 210. More specifically, the silicon chip comprises (1) the semiconductor heads 214 along length $L_1$, (2) the integrated circuits 213 along length $L_2$, (3) PIN diodes 226 along length $L_3$. The abutting gallium arsenide chip 210 which carries the LED's is along length $L_4$.

Methods for producing thermal heads and integrated circuits are disclosed in U.S. Pat. Nos. 3,982,093 and 3,769,562. Specific suitable fabrication steps are described in U.S. Pat. No. 3,982,093 in columns 5, 6 and 7 thereof and illustrated in FIGS. 6A–6G. A chip with the structure illustrated in FIG. 12 can be manufactured according to the teaching of that invention with only minor modifications which would be well known to those of ordinary skill in the art. The heaters are straight semiconductor resistances made of properly doped silicon, rather than two transistors and a resistance. This simpler construction is possible since only a line of thermal heads is used and there is no matrix with its necessary switchings. There are preferably 32 thermal heads 214 at the edge of the chip and they are spaced on approximately 200 micron centers (5 heads/millimeter). The length $L_1$ of the heads is about 300 microns. Holder 208 is made of ceramic and serves also as a heat sink. The silicon chip 212 is fastened to the ceramic 208 by an epoxy layer 270. Contacts to the heaters are made through the metal coating. An insulating layer 272 separates the metal layer 271 from the body of the semiconductor chip 252. A wear protective layer 250 covers the silicon chip.

One of the features of U.S. Pat. No. 3,962,093 suitable for the embodiment 200 consists in the fact that the heating elements, the integrated circuits and the PIN diodes are all on the same (upper) side of the silicon chip 212. Thus the heat from the thermal heads propagates through the thickness of the chip, and the light scattered from the surface of the paper is transmitted through the chip to reach the PIN diodes. Having all the elements on the same side of the chip permits the use of standard integrated circuit fabrication. The fact that it is on the upper side of the chip, away from the paper, allows the circuits to be hermetically sealed and to be well protected. Also the spacing of the PIN diodes away from the paper by the chip thickness makes it possible to properly illuminate the surface of the paper in the region being sensed.

The manufacturing technique described in U.S. Pat. Nos. 3,982,093 and 3,769,562, though appropriate to the present microcopier embodiment 200, are not the only possible ones for it. Among U.S. Patents describing other techniques for fabricating thermal heads and their associated circuits on a single silicon chip are U.S. Pat. Nos. 4,034,187; 3,852,563; and 3,813,513.

All the circuits associated with the thermal and photosensor heads as well as the shift register circuitry 213 are typically 2 to 4 millimeters but is shown greatly shortened in FIG. 12. These circuits are made by conventional techniques known by those skilled in the art in a processing sequence that simultaneously makes the thermal heads 214 and PIN diodes 226.

Matching detectors and light sources have been studied in great detail in recent years because of their fiber-optic communication application. The most commonly used light sources are GaAlAs that emit in the 0.8 to 0.9 micron wave length range. Radiation from these emitters is detected with great efficiency by PIN diodes made of high quality silicon. See, for example, the Review Article by R. C. Smith, Proceedings of the IEEE October 1980, pages 1247–1253. The basics of PIN diodes are discussed by D. P. Schinke et al in "Semiconductor Devices", Volume 38 of "Topics and Applied Physics". The techniques for making the PIN diodes described in the above references are compatible with the standard techniques used to make the other elements of the silicon chip 212. Hence the row of 32 PIN diodes 226 that occupy the length $L_3$ of the chip 212, are made simultaneously with the making of the thermal heads and circuitry.

Figure 13:
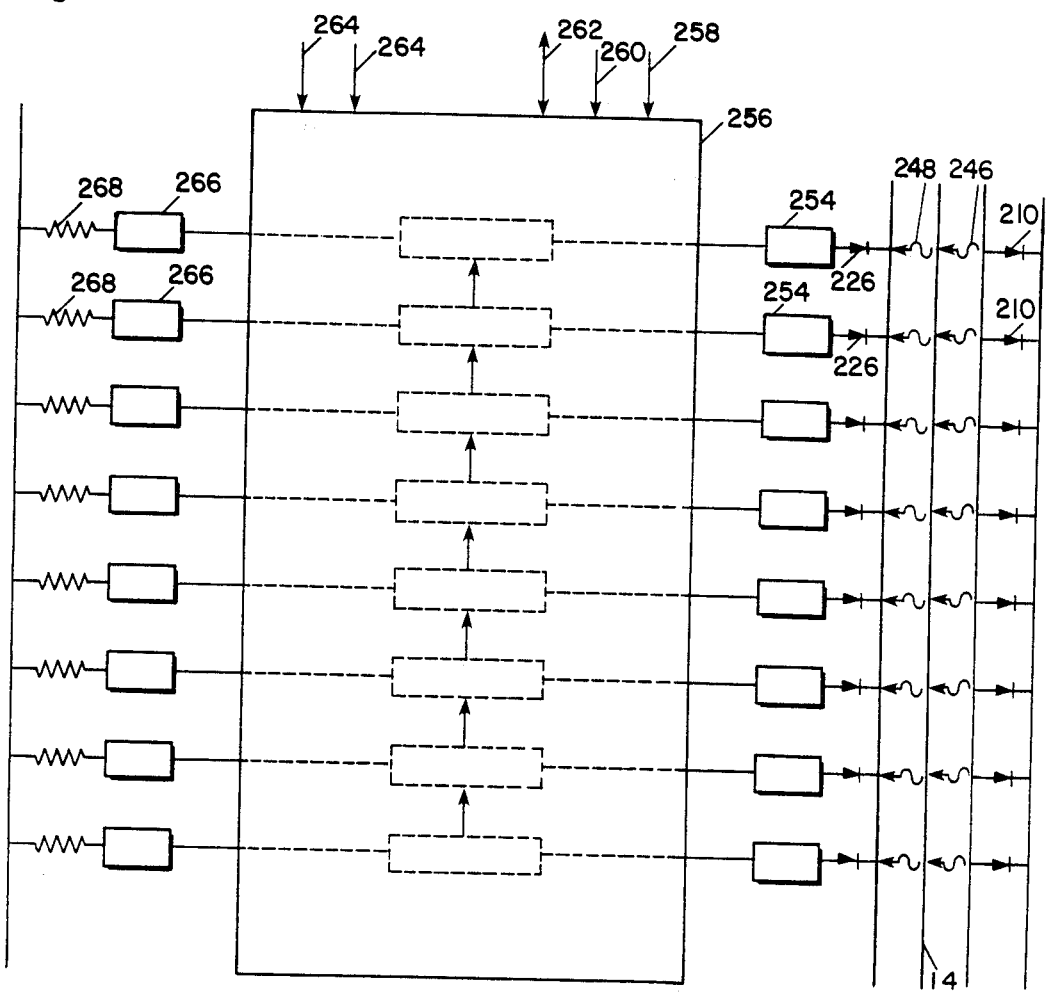
FIG. 13 is an electronic schematic of the circuitry employed in the alternative embodiment 200.

The electronic schematic of alternative embodiment 200 is shown in FIG. 13. Briefly the operation is as follows. Light 246 from galium arsenide LED's 210 illuminates the paper surface 14. Scattered light 248, whose intensity is indicative of the whiteness or blackness of the paper surface 14, strikes the PIN diodes 226. The output of diodes 226 is amplified by amplifiers 254 and integrated. The shift registers 256 scan over the 32 amplifier-integrators 254, sets the read digital values in the register, and brings the integrators to their initial states. The output of shift register 256 is transmitted in seriatim to RAM 56 via lead 262. Subsequent outputs from RAM 56 are brought in seriatim to shift register 256 by lead 262. The outputs of the shift register are transferred in parallel to the thermal head amplifier inputs of amplifier circuits 266. The outputs of the amplifiers 266 activate the thermal heads 268 which selectively blacken the thermal sensitive paper 14. The read and write controls of shift register 256 come in on leads 258 and 260 respectively. Shifting busses 264 control the shifting function of register 256.

Light emitting diodes (LED's) 210 are used for illuminating the surface of the paper 14 rather than solid state lasers because they are more energy efficient and the properties of narrow angled beams and the very high frequency response of the lasers are not significant for the application on hand. A row of 32 LED's 210 made on a gallium arsenide chip 211 are used as the preferred light source of embodiment 200. The gallium arsenide chip 211 abuts against the silicon chip 212 as illustrated in FIG. 12. The LED's are made according to well-known techniques. See specifically the description of H. Kressel et al "Laser Diodes and LED's for Fiber Optical Communications" pages 9–62 of the "Semiconductor Devices" book mentioned above. Special reference is made to pages 37–40 of that reference. Because of the very high index of refraction of the gallium arsenides, much of the internally generated light does not escape the diode 210. To remedy this condition a material of a high index refraction 244 is applied to the diode 210 and its outer surface is made cylindrical so that most rays strike it nearly orthogonally. Accordingly, the index of refraction $n_1$ of material 244 is greater than the index of refraction $n_2$ of material 242. This is the so-called "Burrus LED". The half cylindrical layer of index $n_1$ can be seen below the LED. According to FIG. 2.25 of the Kressel et al article, the LED itself is made up of three layers, a sandwich of a P and N layers, separated by a P or N layer. (layers 234 and 238) The gallium arsenide chip is fastened to the ceramic heat sink 228 by means of an epoxy layer 230. There is a metal layer 234 below the epoxy 230. The LED 210 is formed between layers 234 and 238.

The light 246 from the LED section 210, after passing through the cylindrically shaped material 244 strikes the surface of paper 14. Reflected light 248 is scattered by the surface of the paper 14 in a wide range of directions, and, of course, there is more overall light scattered by a white paper surface than by one covered with black ink. Some of the scattered light 248 is directed towards the PIN diodes 226 that are on the upper side of the silicon chip 212 at its edge. These rays must of necessity pass through some silicon. It turns out that silicon absorbs higher frequency light much more than lower frequency light. The percentage of penetration as a function of wavelength are conveniently shown on curves of FIG. 2 in J. Ya-Min Lee's article "Reduction of Leakage Current, etc.", page 412, Electron Devices Transactions IEEE, Volume ED-28 #4 April, 1981. Hence, the thickness of silicon to be transversed by the scattered light should be as short as possible. This is achieved by slanting the edge of the chip through lapping or grinding. Also the slanting edge causes the light to strike it nearly normally and hence avoid reflections. With the geometry and sizes shown in FIG. 12 the loss of light by absorption can be estimated with the help of Lee's Curves to be less than half for a wavelength of 0.9 microns. The space between the cylindrical coating 244 of the LED's 210 and the slanting edge of the silicon chip is filled with a transparent (to red and infrared light) material 242 of index of refraction $n_2$ smaller than the index $n_1$ of material 244. Material 242, which is not necessary for the operation of the device in a strict sense, serves to prevent dirt from accumulating in the narrow nook it occupies. It also tends to match indexes of refraction. The LED's 210 are mounted on a heat sink to which they are fastened by epoxy 230. The heat sink is, in turn, fastened to the substrate holder or housing 208 that carries the silicon chip 212 as well as wheels 218 and 220. Both holder 208 and heat sink are made of metal.

The overall construction of the alternative embodiment 200 has a number of advantages. The side of the chip carries the heater 214, integrated circuit 212 and the PIN diodes 226, as well as the metallizations mounted on a substrate by means of adhesives such as epoxy. As a result, all of these parts are hermetically sealed and no "passivation" is necessary. Furthermore, the surface of the chip that contacts the paper 14 is coated with a wear resistant layer 250 such as silicon carbide, silicon nitride, silicon dioxide, or a combination thereof. Disclosures of a similar coating are found in U.S. Pat. No. 3,982,093. The entire area of the chip contacts the surface of the paper 14, hence a positive contact of the mesa heaters is insured. This also minimizes wear on the surface.

The abutting gallium arsenide chip 211 with its LED's 210 provides illumination without the complication of lenses, optical fibers or complicated mountings of light sources. While less than a quarter of the light from the LED's 210 is utilized, still the light efficiency compares favorably with other arrangements. Coincidentally, the arrangement of an LED light source abutting a silicon chip has merits beyond the present invention. For example, it would make a very good reader that is simpler to construct than most described in the prior art literature.

Because the bits are transmitted in seriatim to and from the memory 56 and to and from the heads, only one 262 channel of transmission is required between the chip and the memory. In addition to the one or two leads needed for that channel only a few additional leads need to be connected to the chip in order to provide power and to control the shift register 256. Therefore, the number of leads is relatively small. Those leads pass behind the chip through an axial hole in the sphere 202 which supports the holder 208. As previously described an optical fiber 52 for reading the angular markings 46 on wheel 218 also passes through the central axial hole of sphere 202. This lead preferably activates a photodiode formed on the RAM chip 56. Another optical fiber 42 provides illumination of the angular markings 46. It can derive its light from the gallium arsenide chip 210, or else from a special source located in the main body of the pen 200 (not illustrated).

Three practical implementations of the electronic pen have been described as embodiments 10, 100 and 200. The last embodiment 200, using a chip in direct contact with the paper, is especially attractive because of its simplicity and its dependence upon sophisticated integrated circuit techniques rather than on miniature assemblies. It is thus well adapted to low cost mass fabrication.

USES OF THE MICROCOPIER PEN

As previously discussed, the primary use of the electronic pen is as a hand held copying instrument. Roughly the size of an ordinary pen and battery operated, the electronic pen is aimed at the copying of a few lines of text. Some of the uses for which the electronic pen of the present invention are ideal are: copying references, copying names and addresses, copying newspaper citations, copying cooking recipes, copying letters, etc. When the electronic pen is used in these applications no explicit procedure is needed for erasing previously stored information in the pen before inserting new information. The writing of new information will automatically erase old information (presumably already written on paper). In this simplest use of the pen no special provision need be made for addressing the memory, which will always start from a given origin.

The copying of full pages is accomplished more conveniently by regular copying machines. However, full pages can be copied with the electronic pen of the present invention. This may be convenient when a regular copying machine is not available or simply to avoid a trip to a location where it is available. Often a letter or a document needs to be copied in the home and it is a nuisance to have to go to town for the purpose. When copying full pages, the copying is made paragraph by paragraph or line by line, as the storage capacity of the pen's memory may not be sufficient to contain a full page.

The electronic pen can also be used for writing previously stored information. Its internal electronic memory can store information indefinitely (or for very long periods of time, such as months) with suitable means such as a battery for supplying minimal stand-by power. Typically it may be desirable to store one's own name, address, telephone number, etc. so as to avoid having to write these items over and over again. Also for more personal use the recording of Social Security Numbers, Bank Account Numbers, Credit Card Numbers, physician's telephone number, etc. may be desired. A further extension would be the use of the pen as an address book, with the names of friends, business acquaintances, etc. To operate the pen in the storing mode, some provision for addressing the memory is necessary. A few keys for selecting the address could be provided. When setting the pen in the storing mode, access to a stored index could be made. The stored index could be written out and would indicate which key to use to reach any desired internally stored information.

The use of the electronic pen in combination with a hand-held calculator is another attractive extension of its application. A cord connection is made between the calculator and the electronic pen. The connection can be pluggable. The output of the calculator, as displayed by liquid crystals or LED's can also be printed out by the pen. Circuits to generate the appropriate signals for "facsimile" as opposed to seven segment formats can be either in the calculator or the pen. By using this feature, the output does not need to be copied by hand and would thus avoid a chore and transcription errors. This is particularly important when the calculator is used for lengthy calculations with many records of intermediate results. Many calculators are used by home owners to keep track of their bank accounts and for them it would be very convenient to avoid the writing of the number displayed on the calculator.

The reading of numbers in a written form so as to serve as inputs to the calculator implies character recognition and rather complex electronics. However, the reading of numbers previously written from the calculator would require a much simpler image recognition capability, and no such capability at all if the calculator wrote a bar code next to the character.

In a further extension, the electronic pen could be connected through a flexible cord to a computer system, a system that could be very large. For example, a postal employee could scan with a pen a form filled out by a customer and thus generate a copy of the form as well as a record of it in a central computing system.

BOX TYPE MICROCOPIER

The invention thus far has been described as including a row of photosensors, a row of heaters and an internal electronic memory in the form of an elongated wand that resembles an ordinary pen in size and shape. Such a copier is aimed principally at copying one or two lines of text. The number of scanning channels (32) and the capacity of the memory (32K or 64K) have been chosen with that application in mind. Such an electronic pen can be used for longer text by copying one or two lines at a time, and could thus copy a third or half of a standard page without undue inconvenience. It therefore would not be a competitor for ordinary copying machines when one or more pages have to be copied, particularly if several copies of the same page are required.

By providing more channels and a corresponding memory of larger storage capacity, it would be possible for the copying instrument to copy a much wider area with a single sweep. For example, 320 channels would permit an area 6 centimeters wide to be copied in a single sweep. This would require a memory of 320K bits. With the rapid progress in integrated circuit technology that we have experienced to date, a memory of that capacity may easily be made for a cost affordable for a consumer mass product. When the writing and reading heads are made by VLSI on a silicon chip and the illuminators by an abutting gallium arsenide chip, then all of the fabrication depends on LSI and its inevitable forward progress. Hence, at the present time one can easily expect that an instrument with 320 channels and a memory of 320K bits could be manufacturable at a very affordable cost.

Figure 14A:
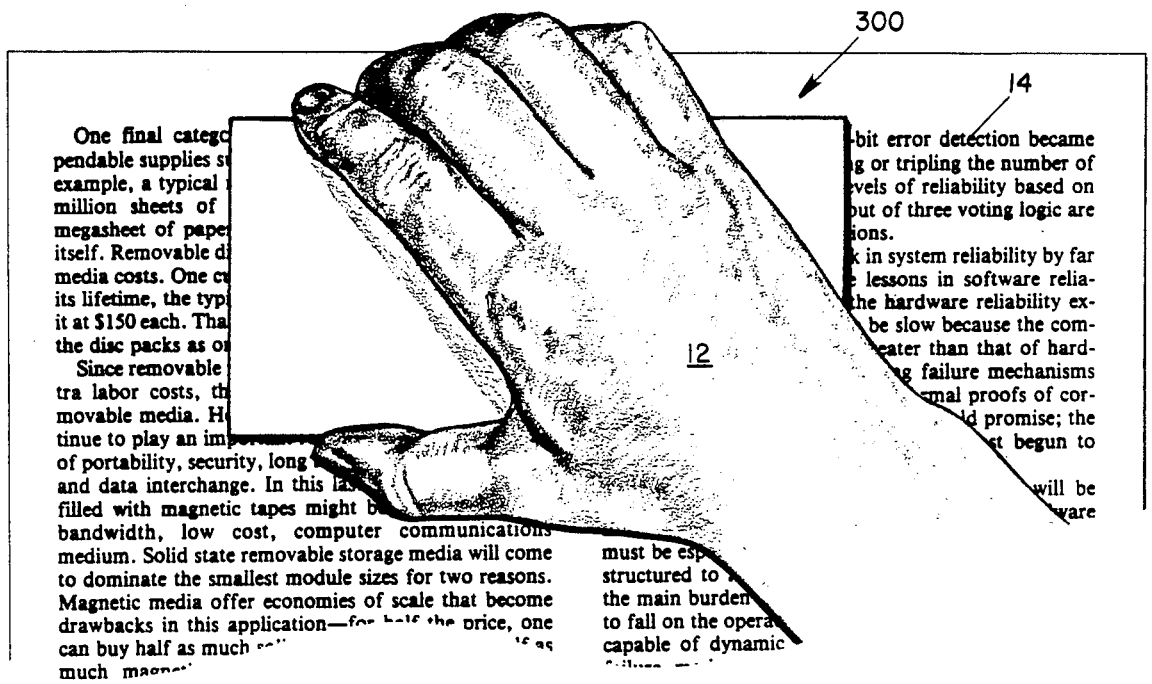
FIG. 14A illustrates a wide sweep embodiment 300.
Figure 14B:
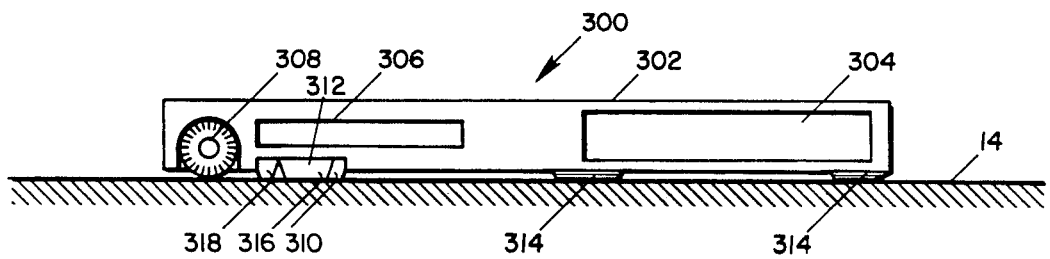
FIG. 14B is a side elevational, cross-sectional view of the alternative embodiment 300 illustrated in FIG. 14A.
Figure 14C:
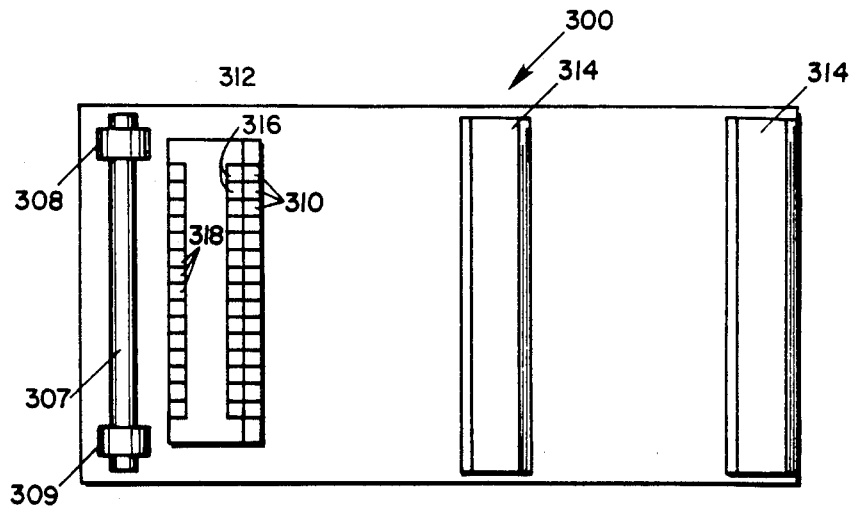
FIG. 14C is a bottom plan view of the alternative embodiment 300 illustrated in FIG. 14A.

A copier 300 capable of sweeping a large area (e.g. 6 centimeters) is illustrated in FIGS. 14A–14C. FIG. 14A illustrates how the copier 300 could be grasped by the hand 12 of the operator and how it could slide over the text 14 to be copied. The case 302 might typically be 7 or 8 centimeters wide, 9 to 12 centimeters long and 10 to 15 millimeters deep. FIGS. 14B and 14C illustrate the location of the reading-writing chip 312, the position reckoning wheel 308 and the associated tracking wheel 309. The two wheels 308 and 309, attached on an axel 307 common to both, are spring-mounted so that downward pressure on the case 302 insures an intimate contact of the chip 312 to paper 14. A pair of pads 314 also help to insure the even contact of chip 312 with paper 14. Silicon chip 312 includes a row of PIN photo-sensor diodes 316 and a set of heater printing elements 318. There is an abutting gallium arsenide chip 310. Internally space is provided for a memory chip 306 and a set of portable batteries 304.

Figure 15A:
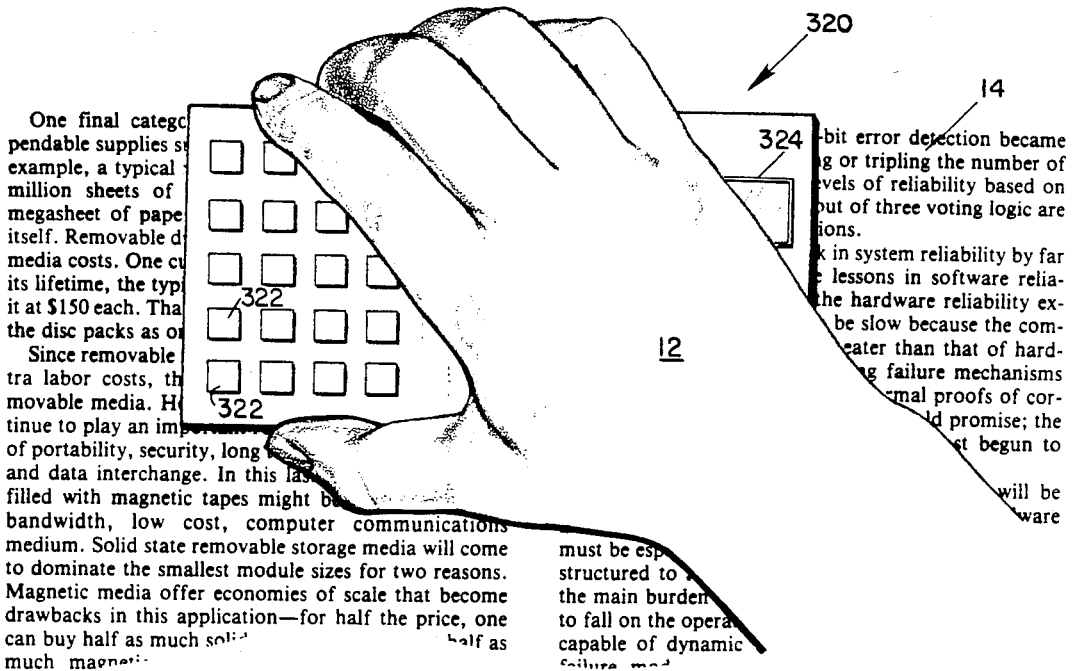
FIG. 15A illustrates another wide sweep alternative embodiment 320 in which the device is integrated into a pocket calculator.
Figure 15B:
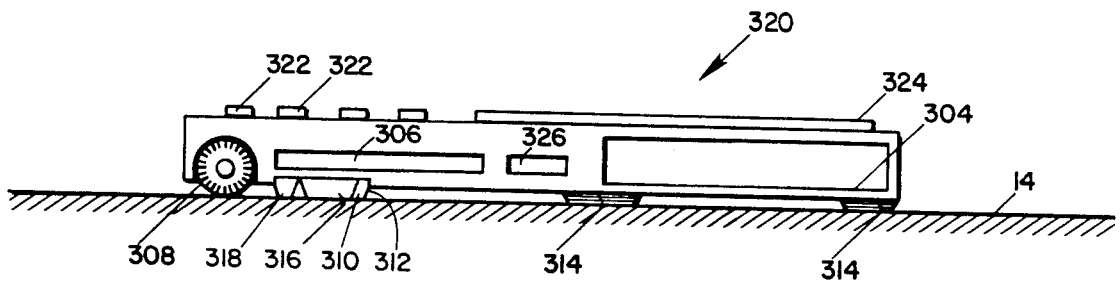
FIG. 15B is a side elevational cross-sectional view of the alternative embodiment 320 illustrated in FIG. 15A.

The shape and size of the box-like copier 300 is very similar to that of a small calculator. Adding a calculator to the copier can be done at a relatively small additional cost. When this is done an instrument 320 as illustrated in FIGS. 15A and 15B is obtained. Of course the output of the calculator 320 can be printed, provided there are adequate conversion circuits to convert 7-segment presentation into a facsimile presentation. It would be advantageous to use an X-Y matrix display which would avoid the necessity of the above conversion, and it would also permit a user to see on the display what is being read by the copier 320. Such a "soft" image of what is being read or what is in stored memory could be sufficient for the user in many cases, so that subsequent writing on thermally sensitive paper could be omitted. On the other hand the user would always have the option of writing the information out. Of course, the copier box 320 could contain a small computer instead of a calculator. An alpha numeric keyboard could be provided. The keys could control an information retrieval algorithm, for information stored as a result of reading a document or as a result of a keyed input. The alternative embodiment 320 of FIG. 15A and 15B also includes a plurality of calculator keys 322, a display window 324 and an additional calculator chip 326 for performing the calculator functions.

WRITING ON PLAIN PAPER

The hand-held copiers 10, 100, 200, 300 and 320 described thus far produce a copy on special thermo sensitive paper. Such papers are widely used and are available in various types and various sizes. Nevertheless, the copier would be more versatile if it could provide a copy on any sort of paper (or on any kind of surface such as cardboard, wood, etc.) For example, writing in a notebook might be made possible without going to the trouble of assembling a notebook out of thermal sensitive paper pages. Writing addresses on envelopes of the standard type would be another example.

One way to write thermally on plain paper is to render it thermal sensitive just before writing. Conventional thermal sensitive papers are manufactured by impregnating ordinary paper with a heat sensitive substance. In general these substances are organic and do not absorb any appreciable (visible) light in their original state. When heated a chemical reaction occurs and the new compound absorbs light. The chemical reaction can be decomposition, oxidation-reduction, metathesis or a coupling. The possibility of thermal writing was suggested in 1963 at the First Congress on Reprography, though there has been earlier work. An early review of the subject was written by Gordon E. Challeen entitled "Development of Thermographic Paper and Methods," which gives specific compounds for the reaction types mentioned above. The chosen material is dissolved in a non-aqueous liquid or else it is dispersed in such a liquid after milling. The paper is then coated with a solution or dispersion, generally by passing the paper through a reservoir containing the liquid.

According to another alternative embodiment 400 of the present invention a thermo sensitive coating is applied by a dispenser resembling an ordinary ballpoint pen. The tip of an ordinary ballpoint pen generally comprises a tiny steel sphere of about 300 to 800 microns in diameter. The sweeping of the pen over the surface of the paper 14 causes the sphere to rotate and thereby to transfer to the paper some of the ink above it. The ink dries instantly. The art of ballpoint pens is highly developed to the point where a very low cost pen can write uniformly for a long period of time without problems such as clogging, start-ups, or smearing.

According to the alternative embodiment 400, a dispenser tube 422 is filled with a thermo sensitive compound and dispersed in the same liquid in which the ink dyes of ballpoint pens are dispersed or dissolved. The thermo sensitive liquid is rolled on the paper by a roller head 432 just ahead of heaters 438. The dispenser 422 preferably has a cylindrical head 432 rather than a spherical head as would be found in a conventional ballpoint pen. The cylindrical structure permits the rolling of a width equal to the width of the row of heaters 438. Alternatively, the dispenser 422 could have a row of spheres spaced in the same proportions as the heaters 438.

A dispenser of thermo sensitive liquid could be added to any form of copier described thus far. Thus, the copier 400 could be used to copy on plain paper. The dispensation of the thermo sensitive liquid should be avoided during a reading sweep in order to preserve the integrity of the material to be copied. One way to insure that the problem does not arise is to have the writing and reading heads at opposite ends of the pen as in embodiment 10 first described. In the case of an implementation having both reading and writing heads the same end, one way of preventing liquid dispersion during the reading sweep is to mount the dispenser so that it normally does not contact the paper and provide for that contact only as a result of extra pressure by the operator.

Figure 16B:
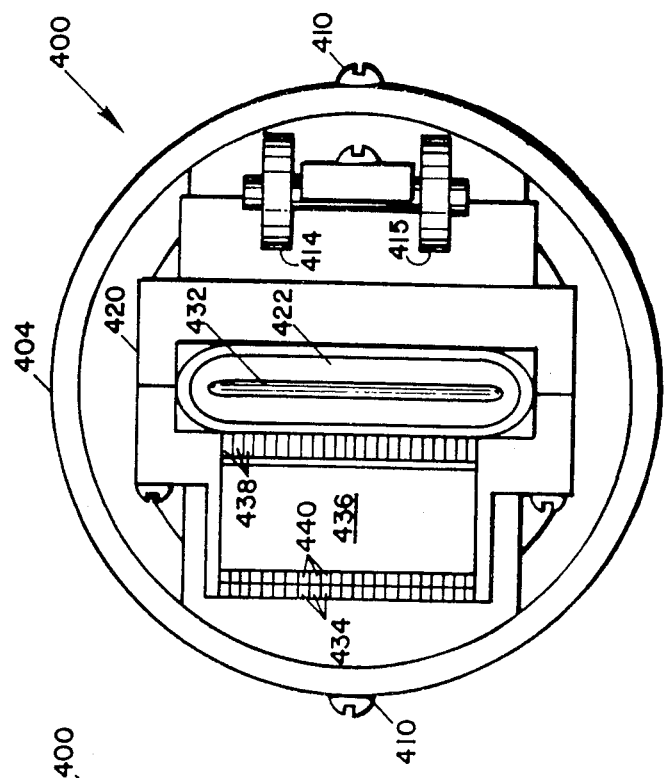
FIG. 16B is a bottom plan view of the alternative embodiment 400 illustrated in FIG. 16A.
Figure 16A:
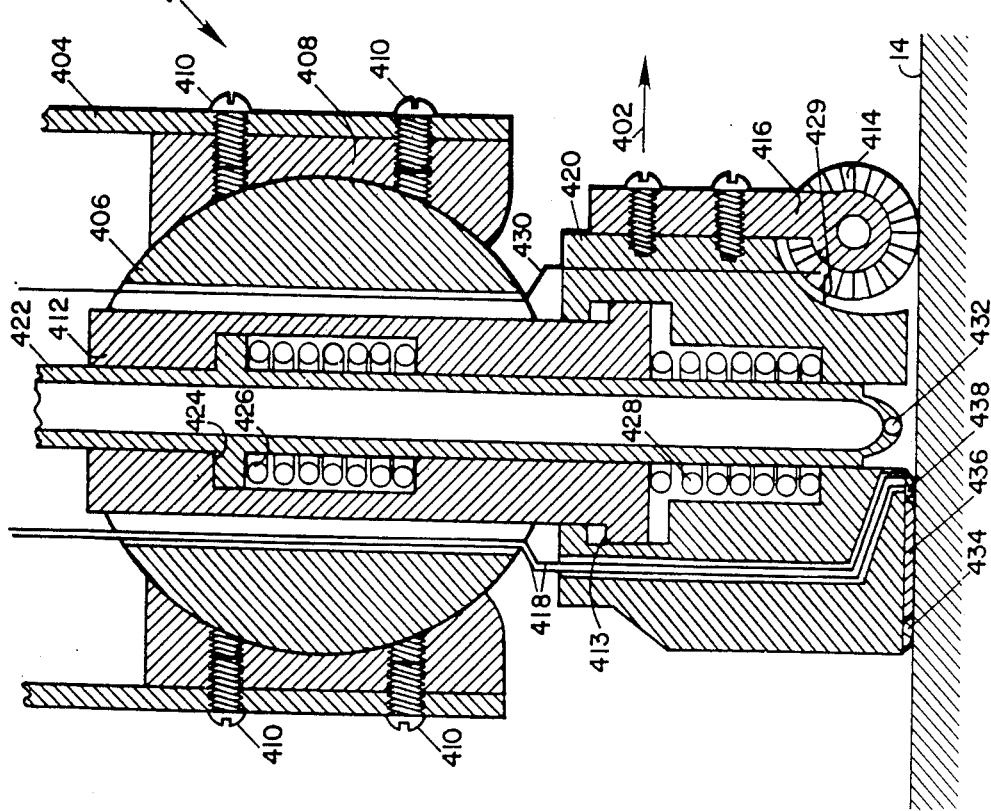
FIG. 16A is a side elevational, cross-sectional view of an alternative embodiment 400 which includes means for dispensing a thermo-sensitive liquid in order to sensitize the paper in anticipation of the writing mode.

A specific alternative embodiment 400 of a copying pen having an integrated read-write head and having a dispenser of thermo sensitive liquid is illustrated in FIGS. 16A and 16B. The dispenser 422, in the center of pen 400, is a flattened cylinder or more precisely a paralleliped terminated by two half circular cylinders. It is generally free to slide up and down an internal track. The track is also a paralleliped with slots and lips and is made in two halves (not illustrated) that are later screwed together. Attached to the guide are two concentric portions of a sphere 406. The sphere is held to the handle 404 by a sphere vice 408. Screws 410 hold the sphere vice 408 in position. The sphere 406 is free to rotate. A holder or housing 420 holds the silicon chip 436 and the associated LED's 434 and heaters 438. Attached to housing 420 is a bracket 416 which supports wheels 414 and 415. The holder 420 is made of two parts that are later screwed together, in order to grasp the guide or inner housing 412 and its lower flange like lip 413. Inner housing 412 in turn houses dispenser 422 and limits its travel by virtue of flange 424. Spring 428 tends to urge the inner housing 412 upwardly away from paper 14. In a similar manner spring 426 tends to urge dispenser 422 upwardly. Therefore, in the unbiased state the cylindrical tip 432 is above the plane of the paper. Manual pressure applied by the hand 12 of an operator is sufficient to force the contact of the dispensing head 432 to the paper 14.

In operation, the pen 400 is pushed down on the paper 14 with a firm downward pressure, but a pressure that is not excessive. That is with a pressure that insures a good contact of the chips 434, 436 and 438 and the guiding wheels 414 and 415 on the surface of the paper 14, but is not insufficient to cause the dispenser head 432 to touch the paper 14. This is the condition in which reading is accomplished by sweeping the pen 400 over the text 14 to be copied. Also, the same normal pressure is used in a writing sweep over thermosensitive paper. However, if it is desired to write on plain paper an extra pressure is exercised by the operator which causes spring 426 to be compressed and the dispenser tip 432 to press against the surface of paper 14. Spring 426 is stiffer than spring 428 and hence, with a relatively small pressure the holder 420 presses the paper 14 so as to insure good contact of the chips 434, 436 and 438 and wheels 414 and 415, but with no contact of dispenser tip 432. With a relatively stronger pressure both springs 426 and 428 are compressed and the dispenser tip 432 presses against paper 14.

The silicon chip 436 carries photosensors, thermo heads 438, amplifiers and a shift register and the gallium arsenide chip 434 carries LED's. Both chips 436 and 438 are made as illustrated in FIG. 12. One of the guiding wheels 414 has angular markings that are illuminated by an optical fiber 429 deriving its light from one of the LED's 434. The angular markings are detected by another fiber 430 which passes through holder 420 and through a slot in one of the sections of sphere 406 to reach a photosensor in the addressing circuitry of the memory 56. Similarly, a few wires 418 that are needed to connect the memory and circuits in the handle 404 of the pen 400 to the chips 436 and 438 also pass through holder 420 and supporting sphere 406. Wires 418 and optical fiber 430 are flexible enough to permit a free rotation of the handle 404 with respect to the holder. The pen, in its normal use is moved in the direction of arrow 402.

The electronic pen 400 illustrated in FIGS. 16A and 16B is relatively easy to make. With it, it is possible to copy on plain paper as well as on thermo sensitive paper.

It is also possible to incorporate a dispenser of thermo sensitive material onto a copier made in a flat box as in alternative embodiments 300 and 320. In that context the body of the dispenser would be along the flat direction of the box, and the end of the dispenser would be bent so that it tip, containing a rolling cylinder or a row of spheres, would contact the surface of the paper. A double spring arrangement would be provided so that the dispenser tip would not contact the paper with a normal pressure used in reading but would contact the paper when it is desired to write on plain paper.

SUMMARY

In summary this invention consists of a microcopier or a hand held copying instrument based upon a novel method of copying. In that method a row of photosensors is manually swept over the material to be copied, the resulting signals are stored in an electronic memory and a row of thermal heads writes a copy of that material on thermo sensitive paper as it sweeps the paper and is activated in response to the stored signals.

In general six embodiments or implementations have been described. In the first embodiment 10, the row of sensors at one end of a pen-like instrument and a row of thermal heads is at the other end. In the second embodiment 100, the photosensors and heads are at the same end, are made both on a silicon chip and illumination is provided through a cylindrical lens. In the third embodiment 200, the photosensors and thermal heads are also at the same end of the pen and also made on a silicon chip, but the illumination is provided by an abutting gallium arsenide chip carrying LED's. In embodiments 300 and 320, the invention consists of a box like copier which allows a wider sweep to be copied in a single stroke. The box can contain a calculator or small computer as in embodiment 320. In the sixth embodiment 400 a pen-like copier is described that generally resembles embodiment 200, but has the very important additional feature of being able to sensitize plain paper and thus allow the user to copy on such plain paper.

The embodiments take advantage of techniques developed in recent years for other applications and use them in novel combinations and also in modified novel forms. These techniques are: (1) hand-held readers of bar codes; (2) thermal printers and thermal heads; (3) LSI and VLSI electronic memories; (4) LSI circuits and LSI LED's; and, (5) ballpoint pens.

A pen-like hand-held copier according to the invention can typically store one or two lines of typewritten, printed or handwritten text as fast as the line or lines can be manually swept. Similarly, the line or lines can be written as fast as the pen can be swept over the paper on which the copy is desired. The speeds of the sweeps can be arbitrarily slow or fast. Copy writing can be immediately after reading or it can be delayed for an arbitrary time. In one form of the instrument thermosensitive paper is used and in another form, any paper is adequate. In the pen-like format the copying instrument is typically suited to copy over a sweep of 5 to 10 millimeters wide and can typically store 32K to 64K pixels. Repetitive sweeps are necessary for copying a wider area.

A box-like hand-held copier 300 or 320 can typically store 8 to 24 lines of text in a sweep of 4 centimeters to 10 centimeters. For such extended applications a memory of 160K to 320K is necessary. Such memories are already available and are small enough to be contained in a hand-held box. As VLSI technology inevitably progresses, memories of such capacity will become physically smaller and less costly. It is natural to combine a box-like copier with a calculator or a small computer as in embodiment 320. The display 324 of the calculator 320 can be used for a "soft" read-out of the stored information.

While the applications of the invention are illustrated in terms of typewritten or printed text, the instrument can be used to copy any patterns of black and white. A very important application is for handwritten text. Another most important application is for Chinese and Japanese characters. It is also very useful for copying records of charts, diagrams, drawings and figures of all sorts.

Commercial applications of the electronic pen or hand-held copying instrument in box-like or other form are many. The copying of a few lines of text is a very frequent chore in the routine of most offices, for example the copying of references in a library, etc. There are also many situations in which a clerk has to copy information furnished to him by the public in written form. Under such circumstance the instrument could not only save time, but could insure accurate transcripts.

Individual uses of the hand-held copier, particularly in its pen-like form, include many of the same applications. Also such trivial but annoying tasks as copying a friends name and address, some notes, a cooking recipe, or a few lines of a newspaper are made much simpler.

An extended application of the hand-held copier is as an input or output of a computer system. The instrument communicates with the system through a flexible cable.

Although the invention is described principally as a method and means to copy with a self-contained hand-held instrument, some individual techniques which form part of the invention have novelty of their own. In particular, the illumination through the use of an abutting gallium arsenide LED and the ability to thermo print on plain paper are believed to be contributions quite different from the prior art.

The arrangement of a gallium arsenide chip abutting a silicon chip can be used for a bar code reading instrument. Such an arrangement is simpler and could be less costly than any of the hand-held bar code reading instruments in use today.

Thermo printing on plain paper is desirable in the multiple applications of thermo printing such as the output of computers, facsimile, output of cash registers, etc. In all those applications, plain rather than thermo-sensitized paper can be used. The idea of sensitizing paper in situ by coating, just previous to thermo writing, by means of a rolling sphere or cylinder dispensing the thermo sensitizing material is believed to be useful in its own right.

While the invention has been described according to the preferred embodiment as employing a thermosensitive printer, it is possible that other types of printers such as impact or ink jet printers might also be employable. It is also possible that hand-held instruments other than pen-like instruments or box-like instruments might be usable too.

While the invention has been described with reference to a preferred embodiment thereof it will be appreciated by those of ordinary skill in the art that changes can be made to the structure and function of the parts without departing from the spirit and scope of the basic invention.

I claim:

1. A pocket sized copying apparatus that copies by manually sweeping said apparatus across the material to be copied and subsequently manually sweeping said apparatus across the material upon which the copy is to be made, said apparatus comprising:

optical reading means for reading the information to be copied and for producing signals related thereto;

addressable electronic memory means for storing said information read by said optical reading means;

writing means controlled by said information stored by said addressable electronic memory means for reproducing the information to be copied;

position reckoning means for producing signals codifying the position of said reading means when it is swept across the material to be copied and for codifying the position of said writing means when it is subsequently swept across the material upon which the copy is to be made;

addressing means to address said addressable electronic memory means in accordance with said position codifying signals, wherein said optical reading means, memory means, writing means, position reckoning means and said addressing means are physically integrated into a hand-holdable unit.

2. The apparatus of claim 1 further comprising:
gimbel means for connecting said reading and said writing means to said case.

3. The apparatus of claim 1 further comprising:
a first gimbel means for allowing said reading means to rotate freely in two substantially respectively perpendicular directions; and,
a second gimbal means for allowing said writing means to rotate freely in two substantially respectively perpendicular directions.

4. The apparatus of claim 1 further comprising:
a gimbel means for allowing said reading and writing means to rotate simultaneously in two substantially respectively perpendicular directions.

5. The apparatus of claim 1 further comprising:
a spring means for pressing said writing means against the surface of the material upon which said copy is to be made.

6. The apparatus of claim 1 wherein said memory means comprises:
a random access electronic memory for storing the signals from said optical reading means at addresses determined by said position codifying signals and for controlling said writing means in accordance with the stored information at addresses determined by said position codifying signals.

7. The apparatus of claim 1 further including:
battery means for energizing said apparatus.

8. The apparatus of claim 1 wherein said optical reading means includes a plurality of photosensors.

9. The apparatus of claim 8 further including
a light source to illuminate the material to be copied.

10. The apparatus of claim 8 wherein said writing means includes a plurality of thermal elements equal in number to the number of said photosensors.

11. The apparatus of claim 10 further comprising:
means for thermally sensitizing the surface of the material upon which the copy is made during the sweep of said apparatus prior to writing on said material by said thermal elements.

12. The apparatus of claim 1 wherein said position reckoning means includes:
a wheel having indicia thereon, said wheel being rotatably attached to said apparatus;

electronic counting means for counting said indicia on said wheel; and, means to produce position codifying signals in response to said electronic counting means.

13. The apparatus of claim 12 wherein said indicia comprise optically detectable markings on said wheel, said apparatus further including:

marking illumination means for illuminating said markings; and, marking reading means for optically detecting said markings.

14. The apparatus of claim 1 further including:

a hand-holdable case for manipulating said apparatus.

15. The apparatus of claim 14 wherein said hand-holdable case has a shape and size similar to that of a fountain pen.

16. The apparatus of claim 15 wherein said optical reading means is located at one end of said case and said writing means is located at the opposite end of said case.

17. The apparatus of claim 15 wherein said optical reading means and said writing means are located substantially adjacent to one another at the same end of said case.

18. A portable electronic copying apparatus that copies by manually sweeping it across the document to be copied and subsequently manually sweeping it across the material upon which the copy is made, said apparatus comprising:

a light source to illuminate the material to be copied;

a plurality of photosensors equally spaced in a row;

an addressable electronic memory with a bit storage capacity substantially greater than the number of said photosensors;

a plurality of printer elements equal in number to that of said plurality of photosensors, said printer elements being spaced equally in a row similar to that of said photosensors, said photosensor and printer rows being parallel to one another and substantially perpendicular to the direction of the sweep of said apparatus;

position measuring means for measuring the position of said row of photosensors as that row is swept across the document to be copied and for measuring the position of said printer element row on the surface of the material on which the copy is to be made as said row is swept across said surface;

addressing means to direct responses of said photosensors into said memory at addresses determined by said position measuring means; and, energizing means to energize said printer elements in response to signals stored in said memory at addresses determined by said position measuring means, wherein said position measuring means provides information concerning the position of said photosensors to said addressing means which information is subsequently used to direct the printing of said printer elements at the correct relative location with respect to said photosensors so that the information read by said photosensors is accurately duplicated by said printer elements.

19. The apparatus of claim 18 further comprising:

a pen-like case for containing the elements of said apparatus and for hand manipulating said apparatus.

20. A portable copying apparatus for reading documents and copying the information thereon onto other materials, said apparatus comprising:

a light source;

reading means for detecting optical information and producing an output related thereto;

addressable electronic memory means connected to said reading means for storing said output from said reading means;

writing means connected to said memory means for reproducing the information read by said reading means;

position reckoning means for reckoning the position of said reading means over said document to be copied and for reckoning the position of said writing means over the material upon which the copy is subsequently to be made and for correlating the writings at any position over said material upon which the copy is made with respect to readings made at the same relative position on said document; and, optical means for directing light from said light source onto the material to be read and for transmitting said light from said material to be read to said reading means.

21. The apparatus of claim 20 wherein said reading means comprises a plurality of photosensors and associated amplifiers and wherein said writing means comprises a plurality of heater elements and associated amplifiers, and wherein said reading means and said writing means are integrated on one side of a single semiconductor chip, said chip also containing a random access memory with associated input and output registers as well as associated address register and circuitry, thereby integrating on a single chip all reading, memory and writing means.

22. The apparatus of claim 20 wherein said optical means comprises two bundles of optical fibers, one bundle for guiding light from said light source to the region of the surface of the material to be read and the other bundle for guiding the light returned therefrom.

23. The apparatus of claim 20 wherein said optical means includes a plurality of disc-like cylindrical lenses having reflective sides.

24. The apparatus of claim 20 wherein said reading means comprises a plurality of photosensors and associated amplifiers, and wherein said writing means comprises a plurality of heater elements and associated amplifiers, and wherein said reading means and said writing means are integrated into a single semiconductor chip, said chip also containing a shift register and associated circuitry, thereby permitting information to be read out from said chip to said memory means and permitting information from said memory means to be read into said chip.

25. A portable copying apparatus for reading a document and subsequently making a copy of said document on other material, said apparatus comprising:

light source means;

reading means for detecting optical information and producing an output related thereto;

electronic memory means connected to said reading means for storing said output from said reading means;

writing means connected to said memory means for reproducing the information read by said reading means;

position reckoning means for producing signals codifying positions of said reading means when said apparatus is moved across material to be copied and for codifying the positions of said writing means when said apparatus is subsequently swept across the material upon which the copy is to be made, wherein said light source means and said reading means are in substantially abutting relationship.

26. The apparatus of claim 25 wherein said reading means, memory means and said writing means are integrated on a first chip and wherein said light source is integrated on a second chip, said first and second chips abutting each other in such a relationship as to make the reading means on said first chip responsive to the light from said second chip which is returned from the document to be copied.

27. The apparatus of claim 25 further comprising:

a case for containing the elements of said apparatus and for holding said apparatus so that said apparatus can be manually swept over the material to be copied and subsequently over the material upon which the copy is to be made.

28. The apparatus of claim 27 wherein said case has an elongated pen-like shape.

29. The apparatus of claim 27 wherein said case is box-like in shape and wherein said apparatus can read, write, and copy a relatively wide sweep of material.

30. The apparatus of claim 27 wherein said apparatus further includes:

a calculator means in said case.

31. The apparatus of claim 21 further including in said case a calculator which operates independently of said copier apparatus.

32. A portable, hand-holdable, self-contained copier apparatus contained in a manipulatable case comprising:

reading means for detecting optical information on a document and producing an output related thereto;

electronic storage means connected to said reading means for storing said output from said reading means;

heater means connected to said storage means for reproducing on plain paper the information read by said reading means;

position reckoning means for reckoning the position of said reading means over the document to be copied and of the position of said heating means over the plain paper on which the copy is to be made and for correlating the writings made by said heater means at any given position over said paper with the readings made by said reading means from said document at the same relative position on said document, so that said heating means accurately duplicates the information read by said reading means;

roller means for applying a thermosensitive liquid on the surface of said plain paper just prior to writing thereon by said heater means; and, means for preventing said roller means from applying said liquid when said reading means is detecting optical information.

33. A hand-holdable, self-contained microcopier apparatus for copying documents by first manually sweeping said apparatus over said documents at an arbitrary first sweep rate and second, subsequently, manually sweeping said apparatus over a thermally sensitive paper at an independent second rate of sweep, said apparatus including:

illumination means for illuminating said document;

a number "n" of photosensors equally spaced in a row;

an equal number "n" of heaters spaced identically to said photosensors in another parallel row;

an electronic memory having "n" inputs and "n" outputs in parallel access panels, said memory being randomly addressable to "N" addresses, each storing "n" bits in parallel, said memory having a total storage capacity of "n" x "N" bits substantially greater than "n";

position reckoning means for measuring the position of said apparatus over said document in its first sweep and the position of said apparatus over said paper in its second sweep and including means to generate a digital binary number which codifies said measured position;

selecting means to select one address among the "N" addresses of said memory in accordance with said digital binary number;

storage means to store in said memory the responses of said "n" photosensors at said selected addresses during said first sweep; and, energizing means to energize said "n" heaters in response to the stored "n" bits in said memory at said selected addresses during said second sweep.

34. A method for copying a document with a hand held apparatus, said apparatus including a row of "n" equally close-spaced photosensors, an equal number of "n" printer elements in a parallel identically spaced row, a random access memory with "n" parallel input and output channels and "N" addresses, position measuring means to measure the location of said apparatus when it is reading information from said photosensors and when it is printing the same information by means of said printer elements, said method comprising the steps of:

manually sweeping said apparatus over said document at a first sweep rate;

storing signals from said "n" photosensors in response to said sweeping in said "N" memory addresses as determined by said position measuring means; and, subsequently sweeping said apparatus over said document at a second sweep rate in such a fashion that said printer elements are selectively energized in accordance with said stored responses in said memory at memory addresses determined by said position measuring means, wherein said first sweep rate is independent of said second sweep rate.

35. A hand-holdable copying apparatus for copying documents by first scanning said apparatus over said document and by subsequently scanning said apparatus over the surface of the material upon which the copy is to be made, said apparatus including:

reading means for sensing the optical information on said document and producing an output related thereto;

an addressable memory for storing the output from said reading means;

writing means controlled by said addressable memory for reproducing the information from said document on said material upon which the copy is to be made;

odometer position reckoning means for measuring the position of said reading means when it is moved across said document and for measuring the position of said writing means when it is subsequently moved across the surface of the material upon which the copy is made and for generating digital signals codifying said measured positions;

addressing means to address said addressable memory with said digital signals which codify the position of said apparatus so that the writing produced by said writing means at any location on the material upon which the copy is made is exactly a duplicate of the information read by said reading means at the same relative position on said document, wherein said reading means, memory means, writing means odometer means and addressing means are physically integrated in a hand-holdable unit.

* * * * *